US012771238B2

(12) United States Patent
Trainer et al.

(10) Patent No.: US 12,771,238 B2
(45) Date of Patent: Oct. 20, 2026

(54) ELECTRICAL POWER SYSTEMS

(71) Applicant: ROLLS-ROYCE PLC, London (GB)

(72) Inventors: David R Trainer, Derby (GB); Jonathan M Stevens, Derby (GB); Robert Slater, Derby (GB); Keval Mehta, Derby (GB); Pablo A Briff, Derby (GB)

(73) Assignee: ROLLS-ROYCE plc, London (GB)

( * ) Notice: Subject to any disclaimer, the term of this patent is extended or adjusted under 35 U.S.C. 154(b) by 192 days.

(21) Appl. No.: 18/938,785

(22) Filed: Nov. 6, 2024

(65) Prior Publication Data

US 2025/0175074 A1 May 29, 2025

(30) Foreign Application Priority Data

Nov. 24, 2023 (GB) ...................................... 2317962

(51) Int. Cl.
*H02M 3/335* (2006.01)
*B60R 16/03* (2006.01)
(Continued)

(52) U.S. Cl.
CPC ............ *H02M 1/325* (2021.05); *B60R 16/03* (2013.01); *H02M 1/0009* (2021.05); *H02M 3/33573* (2021.05); *H02M 3/33592* (2013.01)

(58) Field of Classification Search
CPC ...... H02M 1/325; H02M 1/322; H02M 1/327; H02M 1/36; H02M 1/38; H02M 1/40;
(Continued)

(56) References Cited

U.S. PATENT DOCUMENTS 5,986,903 A * 11/1999 Svensson ............ H02M 7/7575 363/54
11,973,339 B2 4/2024 Wang et al.
(Continued)

FOREIGN PATENT DOCUMENTS

| | | | |
|---|---|---|---|
| CN | 107005150 | A | 8/2017 |
| EP | 3591820 | A1 | 1/2020 |
| WO | 2023/141899 | A1 | 8/2023 |

OTHER PUBLICATIONS

May 17, 2024 Search Report issued in British Patent Application No. 2317962.5.

(Continued)

*Primary Examiner* — Nguyen Tran
(74) *Attorney, Agent, or Firm* — Oliff PLC

(57) ABSTRACT

An electrical power system 10 and a method 300 of controlling an electrical power system 10 are provided. The electrical power system 10 comprises a DC:DC power converter 100 connected between a DC power source 11 and a DC electrical network 12. The DC electrical network 12 comprises at least a first zone $Z_1$ for powering a first group of one or more electrical loads 12$L_{a\text{-}b}$, a second zone $Z_2$ for powering a second group of one or more electrical loads 12$L_{c\text{-}d}$, a first controllable circuit breaker $X_1$, and a second controllable circuit breaker $X_2$. The electrical power system 10 further comprises a control system 150 configured to: in response to determining there is a fault in the DC electrical network 12: control a switching operation of a plurality of transistors of the DC:DC power converter 100 to supply a controlled and gradually increasing amount of current from the DC power source 11 to the DC electrical network 12; open the first controllable circuit breaker $X_1$ if the gradually increasing amount of current supplied to the DC electrical network 12 reaches a level defined by a first trip profile 201, the first trip profile 201 defining a gradually decreasing (Continued)

current level; and open the second controllable circuit $X_2$ breaker if the gradually increasing amount of current supplied to the DC electrical network 12 reaches a level defined by a second trip profile 202, the second trip profile 202 defining a gradually decreasing current level, the gradually decreasing current level defined by the first trip profile 201 being higher than the gradually decreasing current level defined by the second trip profile 202.

20 Claims, 16 Drawing Sheets

(51) Int. Cl.
*H02M 1/00* (2006.01)
*H02M 1/32* (2007.01)

(58) Field of Classification Search
CPC .... H02M 1/32; H02M 1/0003; H02M 1/0006; H02M 1/0009; H02M 1/0019; H02M 1/0022; H02M 3/33573; H02M 3/33576; H02M 3/33546; H02M 3/33592; H02M 3/335; B60R 16/03
See application file for complete search history.

(56) References Cited

U.S. PATENT DOCUMENTS

2020/0058102 A1* 2/2020 Lu ........................ G06T 7/0004
2020/0203943 A1 6/2020 Shen et al.
2024/0146208 A1* 5/2024 Trainer .................. H02H 7/265

OTHER PUBLICATIONS

Van Hertem et al., “Substations for Future HVdc Grids: Equipment and Configurations for Connection of HVdc Network Elements,” IEEE Power and Energy Magazine, 2019, vol. 17, No. 4, pp. 56-66.

* cited by examiner

ELECTRICAL POWER SYSTEMS

This specification is based upon and claims the benefit of priority from UK Patent Application Number 2317962.5 filed on 24 Nov. 2023, the entire contents of which are incorporated herein by reference.

BACKGROUND

Technical Field of the Disclosure

This disclosure relates to an electrical power system comprising a DC electrical network and to a method of controlling such an electrical power system.

Background of the Disclosure

In aerospace, DC electrical networks are increasingly used to distribute electrical power between power sources and loads. For example, AC electrical power generated by one or more engine shaft-coupled electrical generators and rectified by AC:DC converters, or DC electrical power supplied by an energy storage system (ESS), may be distributed to propulsive and/or non-propulsive electrical loads through one or more DC networks.

A DC:DC power electronic converter may be used to interface between two DC parts of an electrical power system. For example, an electrical power system may have two DC electrical networks with different operating voltages, and a DC:DC converter may provide an interface between the two networks so that power can be exchanged between them. In another example, an electrical power system may include a DC electrical network that is supplied with power by an energy storage system (e.g., a battery). The terminal voltage of a battery typically decreases with its state of charge, so a DC:DC converter may be provided between the terminals of the energy storage system and the DC electrical network to stabilise the voltage supplied to the DC electrical network as the battery discharges.

In the event of a fault in a DC network connected to one side of a DC:DC converter, a zero or near-zero impedance is presented across the DC terminals facing the fault. This very low impedance may result in a very large current—referred to herein as the fault current—being fed from the healthy side of the converter to the fault site. It is therefore desirable to isolate the fault, to stop the fault current and to allow remaining healthy parts of the DC network to continue operating.

SUMMARY

According to a first aspect, there is an electrical power system comprising: a DC:DC power converter connected between a DC power source and a DC electrical network, the DC electrical network comprising at least a first zone for powering a first group of one or more electrical loads, a second zone for powering a second group of one or more electrical loads, a first controllable circuit breaker, and a second controllable circuit breaker. The electrical power system further comprises a control system configured to:

- monitor one or more operating parameters of the electrical power system and to determine, based on the one or more operating parameters, whether there is a fault in the DC electrical network;
- in response to determining there is a fault in the DC electrical network:
  - control a switching operation of a plurality of transistors of the DC:DC power converter to supply a controlled and gradually increasing amount of current from the DC power source to the DC electrical network;
  - open the first controllable circuit breaker if the gradually increasing amount of current supplied to the DC electrical network reaches a level defined by a first trip profile, the first trip profile defining a gradually decreasing current level;
  - open the second controllable circuit breaker if the gradually increasing amount of current supplied to the DC electrical network reaches a level defined by a second trip profile, the second trip profile defining a gradually decreasing current level, the gradually decreasing current level defined by the first trip profile being higher than the gradually decreasing current level defined by the second trip profile.

In an embodiment, the control system is further configured to, if the gradually increasing amount of current supplied to the DC electrical network reaches a level defined by the first or second trip profile, control the plurality of transistors of the DC:DC power converter to reduce the amount of current supplied to the DC electrical network before opening the first or second controllable circuit breaker.

In an embodiment, the control system is configured to block (i.e., reduce to zero) the supply of current from the DC power source to the DC electrical network before opening the first or second controllable circuit breaker.

In an embodiment, at least one of the first and second controllable circuit breakers is located between the first zone and the second zone.

In an embodiment, the first controllable circuit breaker is located between the first zone and the DC:DC power converter; and the second controllable circuit breaker is located between the first zone and the second zone.

In an embodiment, the control system is further configured to, after opening the second controllable circuit breaker: determine, based on the one or more operating parameters of the electrical power system, whether the fault in the DC electrical network has been isolated.

In an embodiment, the control system is further configured to, in response to determining the fault in the DC electrical network has been isolated: control the switching operation of the plurality of transistors of the DC:DC power converter to supply a controlled amount of current from the DC power source to the DC electrical network to charge one or more capacitors of the DC electrical network.

In an embodiment, the control system is further configured to, before supplying the controlled amount of current from the DC power source to the DC electrical network to charge the one or more capacitors, control the plurality of transistors of the DC:DC power converter to block the supply of current from the DC power source to the DC electrical network.

In an embodiment, the control system is further configured to, in response to determining the fault in the DC electrical network has not been isolated: control the switching operation of the plurality of transistors of the DC:DC power converter to supply a gradually increasing amount of current from the DC power source to the DC electrical network; and open the first controllable circuit breaker if the gradually increasing amount of current supplied by the DC power source reaches a level defined by the first trip profile.

In an embodiment, controlling the plurality of transistors to supply a controlled amount of current from the DC power source to the DC electrical network comprises: repeatedly switching the DC:DC power converter between two or more different switching configurations of the DC:DC power converter to control an average amount of current transferred from the DC power source to the DC electrical network.

In an embodiment, the control system is configured to control an amount of time the DC:DC power converter is in each of the two or more different switching configurations to control the average amount of current transferred from the DC power source to the DC electrical network.

In an embodiment, the DC electrical network further comprises a third zone for powering a third group of one or more electrical loads, and a third controllable circuit breaker. The control system is further configured to: open the third controllable circuit breaker if the gradually increasing amount of current supplied to the DC electrical network reaches a level defined by a third trip profile, the third trip profile defining a gradually decreasing current level, the gradually decreasing current level defined by the second trip profile being higher than the gradually decreasing current level defined by the third trip profile.

In an embodiment, the DC:DC power converter is a Dual Active Bridge (DAB) DC:DC power converter or an H-bridge DC:DC power converter.

In an embodiment, the DC:DC power converter is a DAB DC:DC power converter comprising: a DC:AC converter circuit having a DC and an AC side; an AC:DC converter circuit having a DC side and an AC side; and an AC link connecting the AC side of the DC:AC circuit and the AC side of the AC:DC converter circuit, the AC link including a transformer having a first winding connected to the AC side of the DC:AC converter circuit and a second winding connected to the AC side of the AC:DC converter. The DC side of the DC:AC converter circuit is connected to the DC power source. The DC side of the AC:DC converter circuit is connected to the DC electrical network. In an embodiment, controlling the plurality of transistors to supply a controlled amount of current from the DC power source to the DC electrical network comprises one or more of: modifying a switching operation of a plurality of transistors of the DC:AC converter circuit so that a waveform of a voltage applied to the first winding of the transformer changes from a square wave to a quasi-square wave; and modifying the switching operation of the first plurality of transistors so that a duty cycle of a waveform of a voltage applied to the first winding of the transformer changes.

In embodiment, the plurality of transistors of the DC:DC power converter are MOSFETs, for example Silicon Carbide (SiC) or Gallium Nitride (GaN) MOSFETs.

In an embodiment, the one or more operating parameters of the electrical power system includes a voltage of the DC electrical network, and the control system is configured to determine there is a fault in the DC electrical network in response to a drop in the voltage.

In an embodiment, the first and second controllable circuit breakers comprise mechanical contactors or semiconductor switches, for example hybrid circuit breakers, solid state power controllers or solid-state circuit breakers.

In an embodiment, the DC power source comprises an energy storage system (e.g., one or more batteries) or a second DC electrical network.

The control system can take any suitable form. For example, the control system may be a single controller, or multiple distributed controllers. It may be implemented in hardware and/or software.

The electrical power system may be or form part of an aircraft power and propulsion system. The power and propulsion system may be a purely electric power and propulsion system, a hybrid propulsion (e.g., gas turbine and battery/fuel cell hybrid, or battery and fuel cell hybrid system), or a 'more electric' propulsion system having propulsive gas turbine engines that interface with an electrical power system through spool-coupled electrical machines.

According to a second aspect, there is an aircraft comprising an electrical power system according to the first aspect.

According to a third aspect, there is a method of operating an electrical power system. The electrical power system comprises: a DC:DC power converter connected between a DC power source and a DC electrical network, the DC electrical network comprising at least a first zone for powering a first group of one or more electrical loads, a second zone for powering a second group of one or more electrical loads, a first controllable circuit breaker and a second controllable circuit breaker. The method comprises:

- monitoring one or more operating parameters of the electrical power system;
- determining, based on the one or more operating parameters, that there is a fault in the DC electrical network;
- controlling a switching operation of a plurality of transistors of the DC:DC power converter to supply a controlled and gradually increasing amount of current from the DC power source to the DC electrical network; and
- controlling the opening of the first and second controllable circuit breakers according to respective first and second trip profiles.

The control system opens the first controllable circuit breaker if the gradually increasing amount of current supplied to the DC electrical network reaches a level defined by the first trip profile. The control system opens the second controllable circuit breaker if the gradually increasing amount of current supplied to the DC electrical network reaches a level defined by the second trip profile. The first and second trip profiles define gradually decreasing current levels. The gradually decreasing current level defined by the first trip profile is higher than the gradually decreasing current level defined by the second trip profile.

In an embodiment, the method further comprises: in response to the gradually increasing amount of current supplied to the DC electrical network reaching the level defined by the second trip profile, before opening the second controllable circuit breaker, controlling the switching operation of the plurality of transistors of the DC:DC power converter to block the supply of current from the DC power source to the DC electrical network.

In an embodiment, the method further comprises, after opening the first or second controllable circuit breaker: controlling the switching operation of the plurality of transistors of the DC:DC power converter to supply a controlled amount of current from the DC power source to the DC electrical network to charge one or more capacitors of the DC electrical network.

In an embodiment, the method further comprises, after opening the first or second controllable circuit breaker and before controlling the switching operation of the plurality of transistors of the DC:DC power converter to supply a controlled amount of current from the DC power source to the DC electrical network to charge one or more capacitors of the DC electrical network: controlling the switching operation of the plurality of transistors of the DC:DC power converter to block the supply of current from the DC power source to the DC electrical network.

The skilled person will appreciate that except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
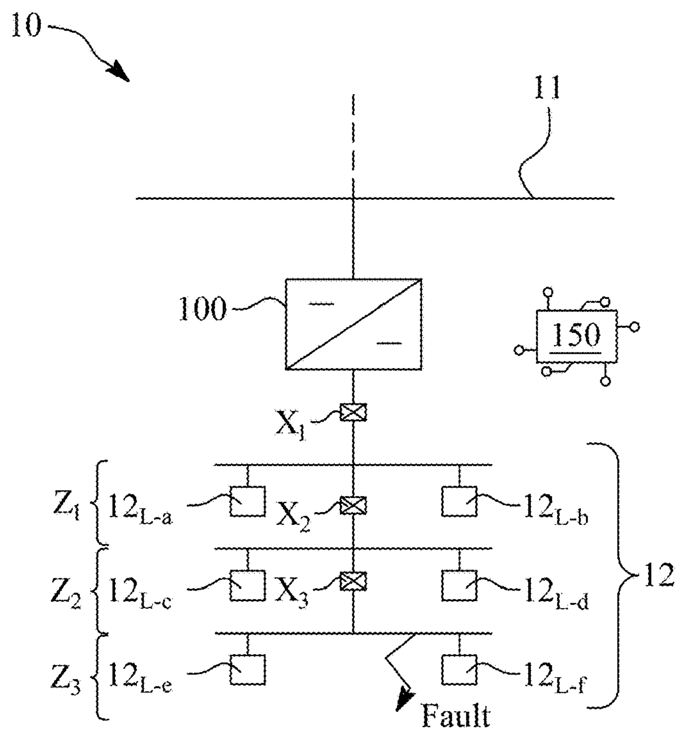
FIG. 1 is a schematic illustration of a portion of an electrical power system comprising a DC electrical network divided into zones.

FIG. 1 illustrates a portion of an electrical power system 10. The electrical power system 10 includes a DC power source 11, a DC electrical network 12, a DC:DC power converter 100 connected between the DC power source 11 and the DC electrical network 12, and a control system 150. The DC power source 11 may be an energy storage system (ESS) or another DC electrical network that may have its own source of electrical power connected thereto (ec, an ESS or an electrical generator). The DC:DC power converter 100 provides an interface between the DC power source 11 and the DC network 12, for example by matching a voltage of the power source 11 to the voltage of the DC network 12. Power can therefore flow between the power source 11 and DC network 12, either unidirectionally or bidirectionally depending on the desired functionality.

In the event of a fault in the DC electrical network 12, a low impedance (in the limit, zero) will be presented across the terminals of the DC:DC power converter 100 facing the DC network 12. This will cause a large fault current to flow from the DC power source 11 to the DC network 12 via the DC:DC converter 100. To protect loads and other components (e.g., cables and connectors) from the fault current and to allow continued operation of the remaining healthy portions of the DC network 12, it is desirable to isolate the fault.

To this end, the DC electrical network 12 is divided into multiple (i.e., at least two) zones connected via controllable circuit breakers. In this non-limiting example, there are three zones $Z_1$, $Z_2$, $Z_3$ and three circuit breakers $X_1$, $X_2$, $X_3$. The first zone $Z_1$ includes a first group of one or more loads $\mathbf{12}_{L\text{-}a}$, $\mathbf{12}_{L\text{-}b}$, the second zone $Z_2$ includes a second first group of one or more loads $\mathbf{12}_{L\text{-}c}$, $\mathbf{12}_{L\text{-}d}$ and the third zone $Z_3$ includes a third first group of one or more loads $\mathbf{12}_{L\text{-}e}$, $\mathbf{12}_{L\text{-}f}$. The first circuit breaker $X_1$ is located between the DC:DC converter 100 and the first zone $Z_1$. The second circuit breaker $X_2$ is located between the first zone $Z_1$ and the second zone $Z_2$. The third circuit breaker $X_3$ is located between the second zone $Z_2$ and the third zone $Z_3$. If there is a fault in, e.g., one of the loads $\mathbf{12}_{L\text{-}f}$ in the third zone $Z_3$, the control system 150 can open the third circuit breaker $X_3$ to isolate the third zone $Z_3$ from the remaining, healthy zones $Z_1$, $Z_2$ which can then return to normal operation.

Figure 2:
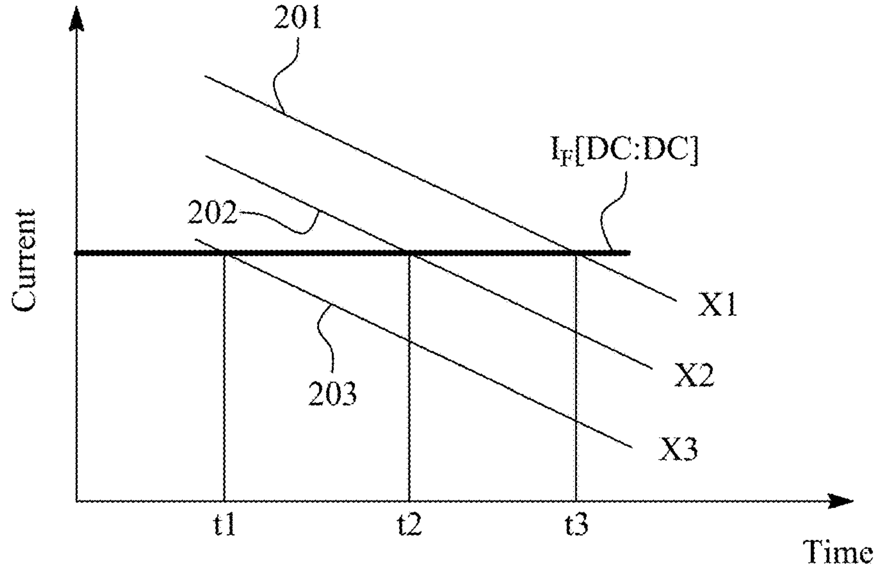
FIG. 2 is a plot illustrating the use of circuit breaker trip profiles for fault location discrimination.

To identify which circuit breaker(s) should be opened to isolate the fault, the control system 150 implements a fault discrimination procedure. An example fault discrimination procedure is illustrated in FIG. 2. For each of the circuit breakers $X_{1\text{-}3}$, the control system 150 has (e.g., stores in accessible memory) a pre-defined trip profile 201-203. Each trip profile 201-203 defines a time-variable current level. For each trip profile 201-203, the defined current level gradually reduces with time.

When the fault occurs, a fault current $I_F$, the value of which may depend on the voltage of the DC power source 11 and the impedance of the fault current path, is supplied to the DC network 12. As illustrated in FIG. 2, the control system 150 opens a respective circuit breaker $X_{1\text{-}3}$ when the current level defined by the corresponding trip profile 201-203 has decreased to the fault current $I_F$. Thus, referring to FIG. 2, the third circuit breaker $X_3$, whose trip profile 203 defines the lowest current value for any given time instant, is opened first at time $t_1$. If the fault was located in the third zone $Z_3$ of the DC network 12, as shown in the example of FIG. 1, the fault will be isolated. The control system 150 may determine the fault has been isolated based on one or more operating parameters of the system, for example the DC network voltage will suddenly increase, having collapsed to zero or near zero when the fault occurred. If the fault was not in the third zone $Z_3$, the fault will remain and the fault discrimination procedure will continue. The control system 150 opens the second circuit breaker $X_2$ at time $t_2$. If the fault is still not isolated, the control system 150 opens the first circuit breaker $X_1$ at time $t_3$.

While the fault discrimination procedure of FIG. 2 is effective in identifying and isolating a fault, it involves the full fault current, $I_F$, being transmitted to the entire DC network 12 until the time the fault is isolated. This may create particular problems for lower power loads within the DC network 12. For example, if the platform had a current rating of 200 A and the DC:DC converter 100 injects a fault current, $I_F$, of 300 A, this would represent a 30 per-unit over-current to a 10 A load. Such a high per-unit loading could damage the load and associated cables and connectors.

Figure 3:
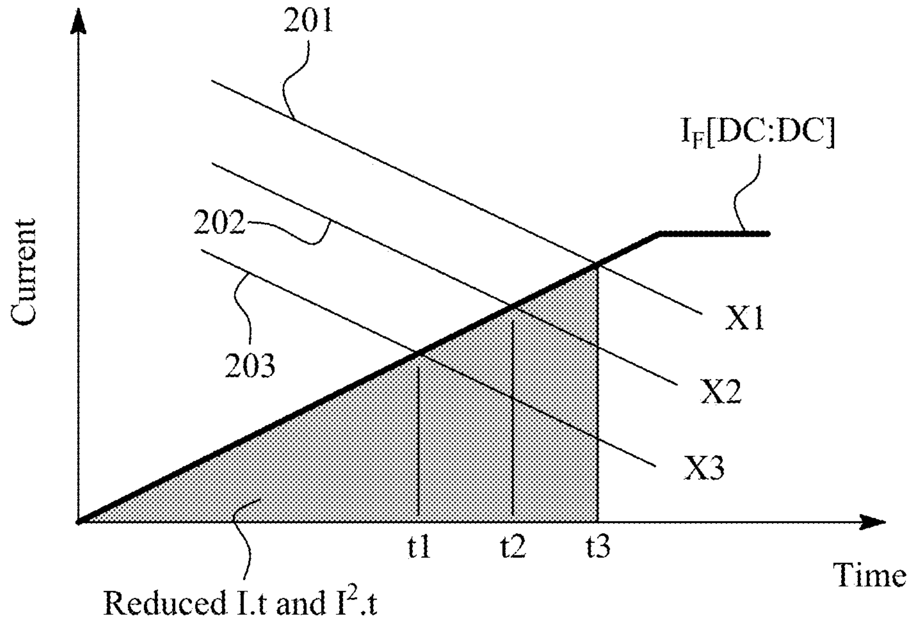
FIG. 3 is a plot illustrating the use of circuit breaker trip profiles and a controlled increase in the fault current for fault location discrimination.

An example fault discrimination procedure in accordance with the present disclosure is illustrated in FIG. 3. As in FIG. 2, the control system 150 uses circuit breaker trip profiles 201-203 for fault discrimination. However, the fault discrimination procedure of FIG. 3 differs from that shown in FIG. 2 in that the control system 150 controls the DC:DC converter 100 so that, instead of passively allowing the full current to pass to the network 12, it is controlled to pass a gradually increasing amount of current to the network.

The amount of fault current supplied to the network 12 can be controlled by controlling a switching operation of the transistors of the DC:DC converter 100, as explained in detail in UK Patent Application Nos. 2315701.9 (filed 13 Oct. 2023), 2315703.5 (filed 13 Oct. 2023) and 2316708.3 (1 Nov. 2023), the entire contents of which are incorporated herein by reference. By way of example, some of these DC:DC converter control techniques are described below with reference to FIGS. 8A to 12C.

Returning to FIG. 3, when the gradually increasing fault current level reaches (e.g., intersects) that of the gradually decreasing current level defined by the third trip profile 203 (i.e., at time $t_1$), the third circuit breaker $X_3$ is opened. If the control system 150 detects the fault has been isolated (e.g., a sudden rise in the network voltage), the fault discrimination and isolation procedure can stop. If not, the control system 150 proceeds to further increase the amount of fault current allowed to reach the network 12. When the current level reaches the gradually decreasing current level defined by the second trip profile 202 (i.e., at time $t_2$), the second circuit breaker $X_2$ is opened. If the control system 150 detects the fault has been isolated, the fault discrimination and isolation procedure can stop. If not, the control system 150 proceeds to further increase the amount of fault current allowed to reach the network 12. When the current level reaches the gradually decreasing current level defined by the first trip profile 201 (i.e., at time $t_3$), the first circuit breaker $X_1$ is opened.

As indicated in FIG. 3, this approach may reduce the time-integrated current I*t supplied to the faulted DC network, and also the integrated value of $I^2*t$, which is proportional to the heat dissipated due to the fault current. Thus, the likelihood of damage to the network 12, particularly lower power loads within the DC network 12, may be reduced.

Figure 4:
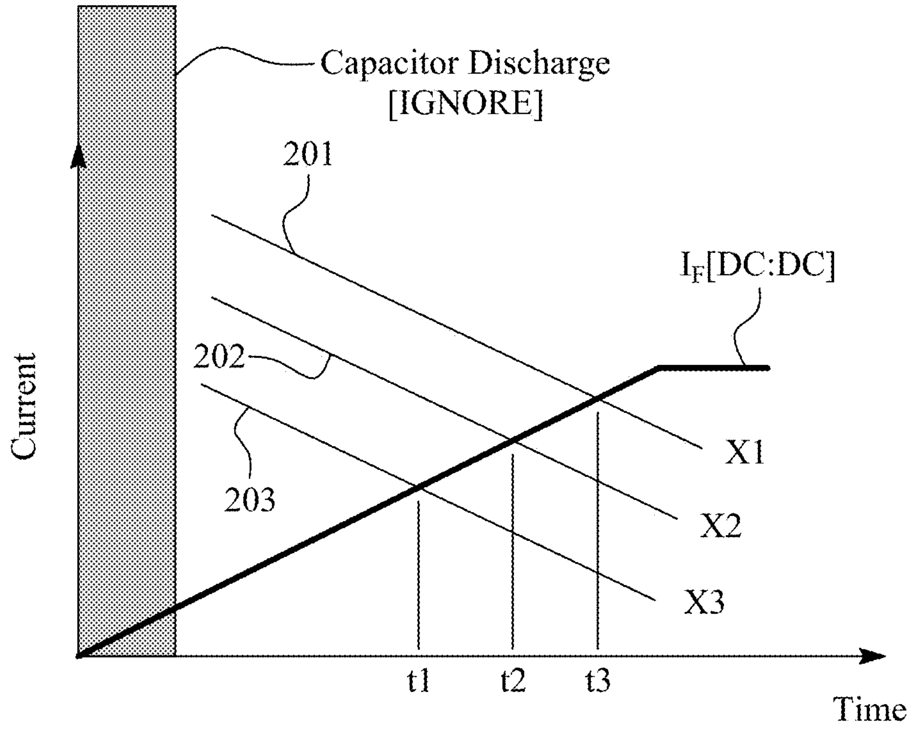
FIG. 4 is a plot further illustrating an initial capacitor discharge.

Another example fault discrimination procedure is illustrated in FIG. 4. When a fault occurs in a DC network 12, the collapse of the network voltage may lead to capacitors in the network to discharge. This can result in a large but brief pulse of current through the network 12. If the fault occurs at a nominal time t=0 and the control system 150 immediately beings to implement the trip profiles 201-203 shown in FIG. 3, this could lead the control system 150 to almost immediately instruct the opening of one or more of the circuit breakers $X_{1-3}$. As well as preventing proper fault discrimination and isolation, this could cause damage to the circuit breakers (e.g., due to contactor arcing). Thus, as indicated in FIG. 4, the control system 150 may be configured to ignore the initial capacitor discharge pulse. For example, the control system 150 may be configured to begin implementing the trip profiles 201-203 after a predefined amount of time after detection of the fault. As another example, upon detecting that a measured network current is at or above a level defined by a trip profile, the control system 150 may first compare the measured current to a current level the DC:DC converter 100 is being controlled to supply. If the two current levels differ (e.g., by more than a threshold amount), the control system 150 may determine that the measured current is a result of capacitor discharge and therefore not instruct the opening of the circuit breaker.

Figure 5A:
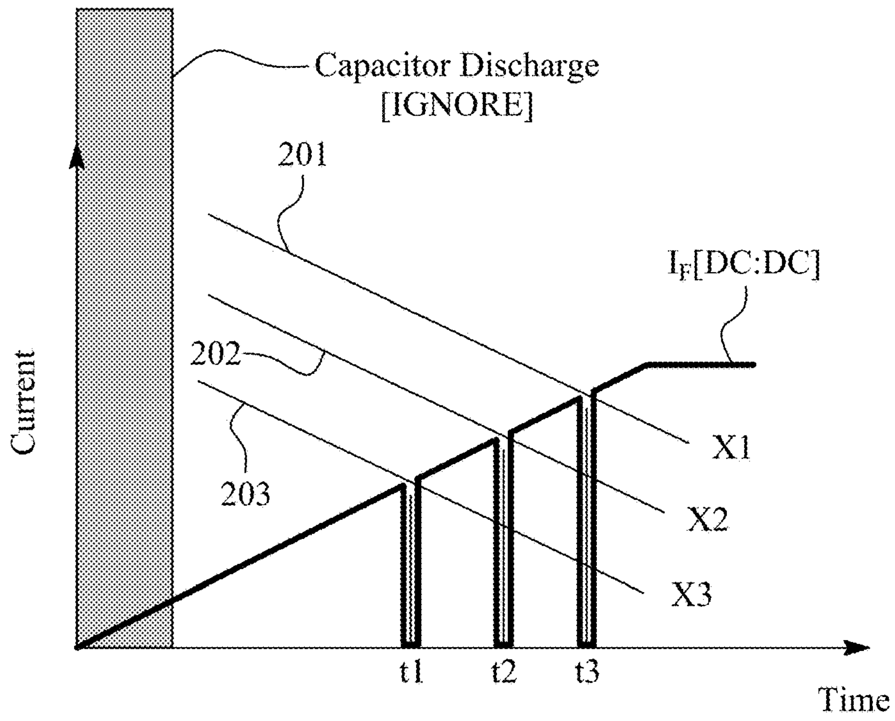
FIG. 5A is a plot illustrating how the fault current may be blocked before opening the circuit breakers to reduce the likelihood of arcing.
Figure 5B:
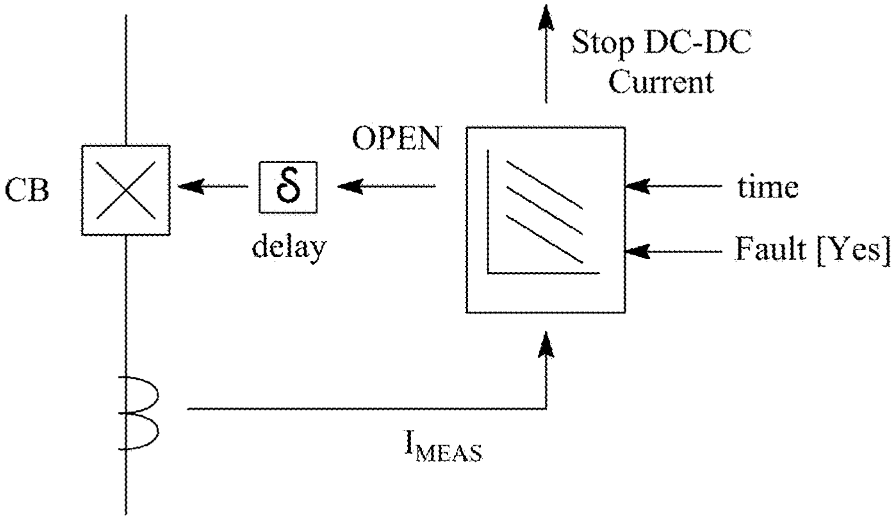
FIG. 5B is a schematic illustration of a control scheme for the plot of FIG. 5A.

Another example fault discrimination procedure is illustrated in FIGS. 5A-5B. Here, in response to determining that the controlled and gradually increasing amount of fault current ($I_{MEAS}$) supplied by the DC:DC converter 100 to the DC network 12 has reached a level defined by a circuit breaker trip profile 201-203, the control system 150 controls the DC:DC converter 100 to block the supply of current to network 12 before opening the corresponding circuit breaker $X_{1-3}$. Thus, the current level drops to zero before opening a circuit breaker. By opening the breaker at zero current, the risk of damage to the breaker (e.g., due to contactor arcing) may be reduced. While in this example the current is completely blocked (e.g., by turning off healthy-side transistors facing the DC power source 11, or by adopting a crowbar configuration as described below), in other examples it may be reduced to a lower, non-zero, value at which damage is unlikely to occur.

In more detail, when, at time $t_1$, the current reaches the level defined by the third trip profile 203, the control system 150 instructs the DC:DC converter 100 to block the supply of current to the network 12. After blocking the current (e.g., after a short time delay of δ, perhaps of the order of a few μs), the control system 150 instructs the third circuit breaker $X_3$ to open. If the control system 150 detects the fault has been isolated (e.g., a sudden rise in the network voltage), the fault discrimination and isolation procedure can stop. If not, the control system 150 again increases the amount of fault current allowed to reach the network 12, in this example starting from the current level which had previously been reached. When, at time $t_2$, the current level reaches the gradually decreasing current level defined by the second trip profile 202, the control system 150 instructs the DC:DC converter 100 to block the supply of current to network 12. After blocking the current, the control system 150 instructs the second circuit breaker $X_2$ to open. If the control system 150 detects the fault has been isolated, the fault discrimination and isolation procedure can stop. If not, the control system 150 again increases the amount of fault current allowed to reach the network 12, in this example starting from the current level which had previously been reached. When, at time $t_3$, the current level reaches the gradually decreasing current level defined by the first trip profile 201, the control system 150 instructs the DC:DC converter 100 to block the supply of current to network 12. After blocking the current, the control system 150 instructs the first circuit breaker $X_1$ to open.

In each of the examples described above, the trip profiles 201-203 define linearly decreasing current levels with equal gradients but different starting values. This is not intended to be limiting. For example, the trip profiles may be curves and/or may have different gradients. The trip profiles and the combination of trip profiles may be selected according to the design and requirements of the electrical power system.

Further, in each of the examples described above, the controlled and gradually increasing amount of current supplied to the DC network 12 increases in a linear fashion from zero. This is not intended to be limiting. The current could instead be increased in a non-linear fashion and/or from a low but non-zero initial value. Generally, if the current is increased more aggressively (e.g., in a quadratic fashion) or from a higher starting current, the fault will be isolated faster. Conversely, if the current is increased less aggressively (e.g., logarithmically or with a reduced linear gradient), the fault will take longer to be isolated. By taking account of the trip profiles 201-203, the manner (e.g., linear or quadratic), rate (e.g., gradient) and zero-time current offset of the controlled current increase may be selected to minimize the integrated value of I*t or $I^2$*t.

Further, in each of the examples described above there are three zones $Z_{1-3}$ and three circuit breakers $X_{1-3}$. This is a simple example selected for each of explanation and is not intended to be limiting. For example:

- The (or each) DC network 12 may have two zones, three zones or more than three zones.
- The number of circuit breakers and their arrangement within the DC network may be different. For example, using the arrangement in FIG. 1, isolating a fault in $Z_1$ or $Z_2$ would necessarily isolate $Z_3$ even if there was no fault in $Z_3$. A different network arrangement with a greater number of circuit breakers and corresponding trip profiles could be used to provide greater flexibility in the isolation of different zones.
- While contactors have been described, the controllable circuit breakers could be other components. For example, hybrid circuit breakers or solid-state circuit breakers (SSCBs) could be used instead.

Figure 6:
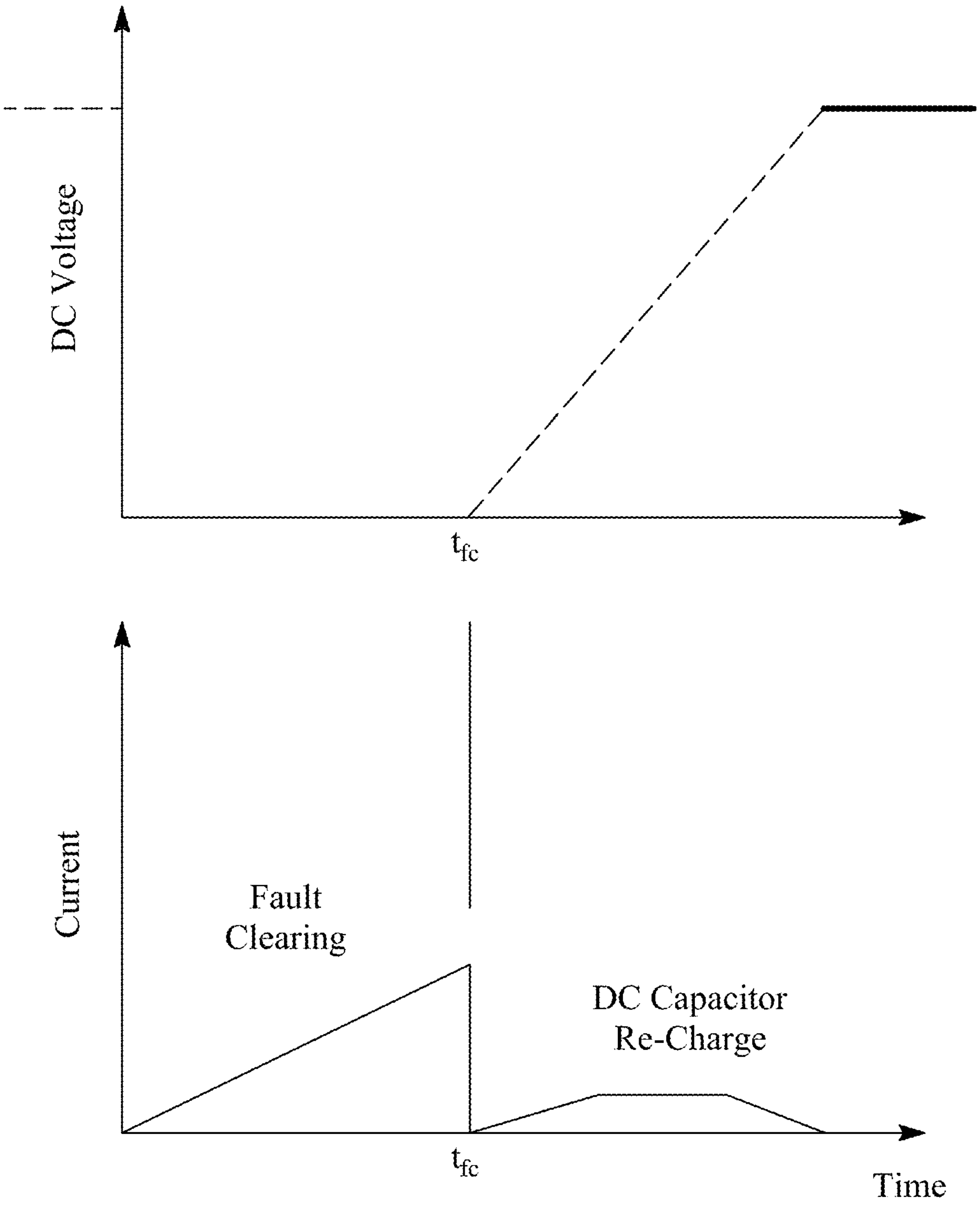
FIG. 6 shows plots illustrating how one or more capacitors of a DC electrical network may be recharged after isolating a fault.

Turning now to FIG. 6, as noted previously, a consequence of a fault in a DC network 12 is that the network voltage collapses to zero or near-zero, leading to the discharge capacitors in the faulted network. Once the fault is isolated, the network voltage will begin to rise. In response to this rise or another indication that the fault is isolated, the control system 150 may initially block the flow of current to the previously faulted network, for example by turning off the healthy-side transistors or by using a crowbar configuration in which current circulates within the converter 100. After blocking the current, the DC:DC converter 100 may be controlled to inject current (e.g., a low amount of current) into the affected DC network to re-charge the capacitor(s). By doing so, it may be possible to quickly restart the electrical power system without necessarily employing soft-start circuits comprising contactors and resistors.

The process is illustrated in FIG. 6. At time zero, the fault in the DC network occurs and the network voltage collapses to near-zero (see top graph). Upon detection of the fault, the fault current is blocked, meaning the network current drops to zero (see bottom plot). Following this, between time zero and time $t_{FC}$, as described above a controlled and gradually increasing fault current is supplied to the DC network 12 to identify and clear the fault. At time $t_{FC}$, the fault is cleared, and the network voltage begins to increase (see top graph). In response, the current is initially blocked (e.g., by switching off the transistors of the healthy side of the converter). After this, the DC:DC converter 100 is controlled to supply a controlled amount of current to recharge capacitors in the affected network. Once the capacitors are charged and the network voltage has reached its target value, normal operation of the electrical power system resumes.

Supplying a controlled current through control of the DC:DC converter 100 to pre-charge the capacitor(s) may provide further advantages, including the optional omission of pre-insertion resistors (PIRs) in some or all of the power system. PIRs are conventionally fitted to converters to protect the capacitors and converter diodes against high inrush currents at converter start-up, which can degrade the capacitors and semiconductors and limit their lifetime. However, by controlling the current as described herein, the inrush current can be controlled and the PIRs omitted.

Figure 7:
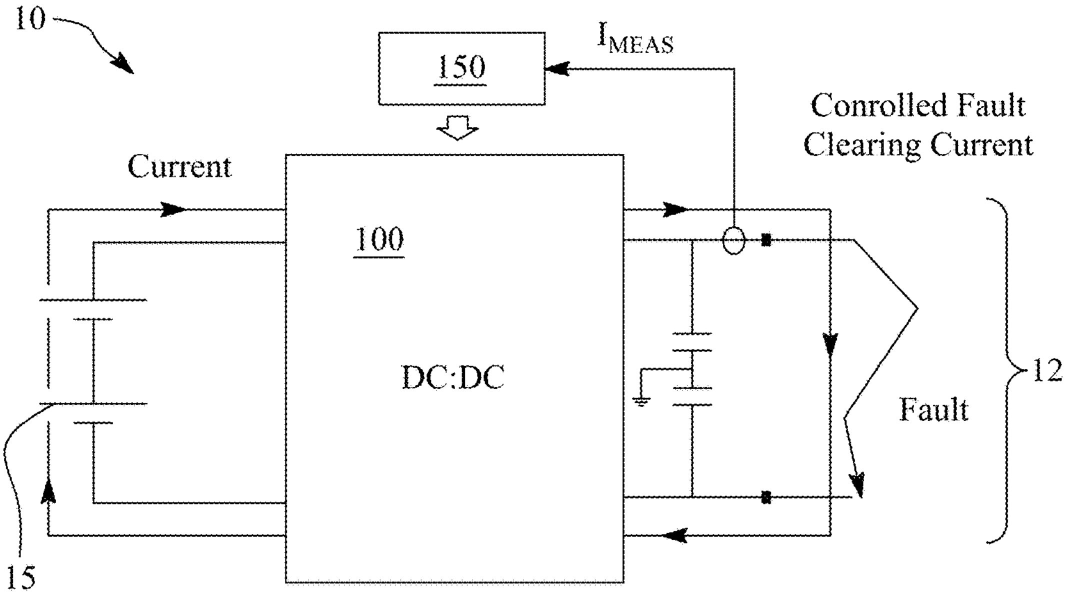
FIG. 7 is a schematic illustration of an electrical power system in which a DC:DC converter is controlled to supply a controlled amount of fault current to a faulted DC electrical network.

In each of the embodiments described above with reference to FIGS. 3 to 6, the DC:DC converter 100 supplies a controlled amount of current to the DC network 12 for fault discrimination and isolation (FIGS. 3 to 5) or capacitor recharging (FIG. 6). This is illustrated schematically in FIG. 7, where a control system 150 monitors one or more operating parameters of the system 10 and, following detection of a fault, controls the transistors of the DC:DC converter 100 so that the DC:DC 100 converter allows a controlled current to pass from a DC power source (shown in the form of an ESS 15) to the network 12. Example implementations will now be described with reference to FIGS. 8A to 12C.

Figure 8A:
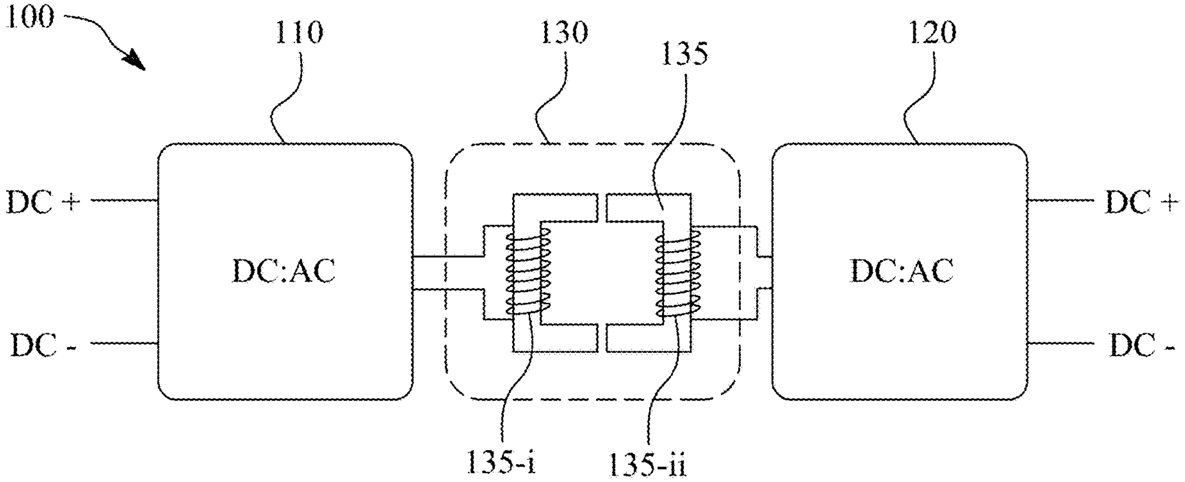
FIG. 8A is a schematic illustration of a DAB DC:DC power converter.
Figure 8B:
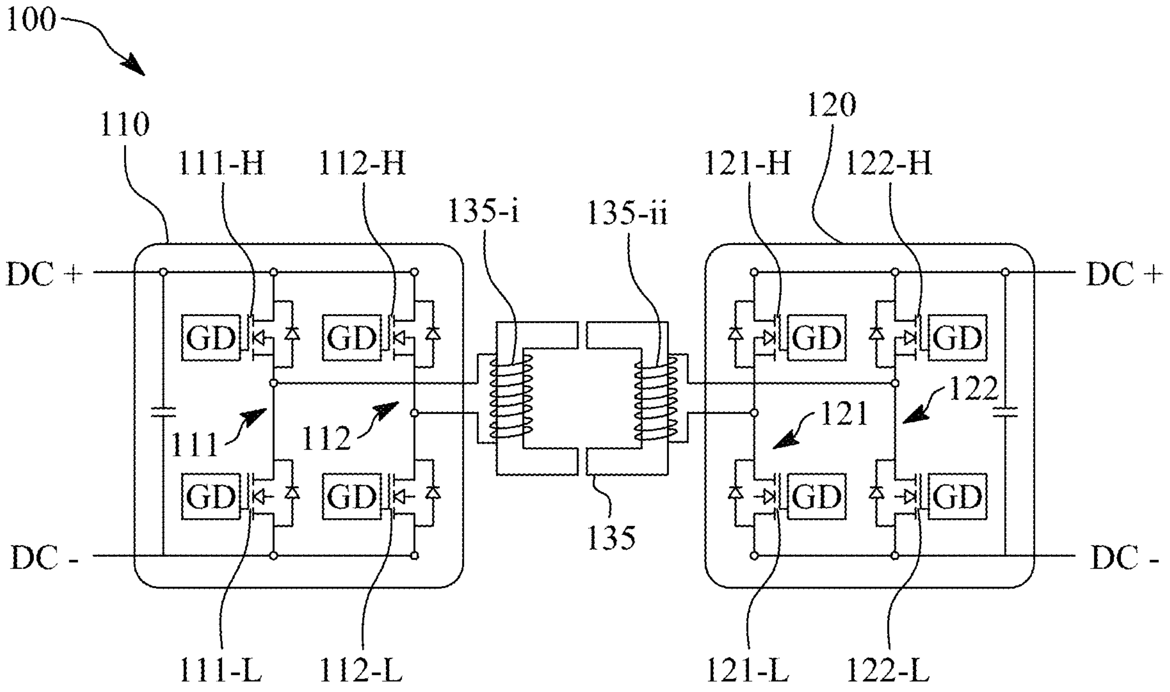
FIG. 8B illustrates a DAB DC:DC converter with exemplary converter circuit structure.

FIG. 8A illustrates a Dual Active Bridge (DAB) DC:DC converter 100. The DAB DC:DC converter 100 includes a DC:AC converter circuit 110, an AC:DC converter circuit 120 and an AC link 130. The AC link 130 includes a transformer 135 that has a first winding 135*i* connected to an AC side of the DC:AC converter circuit 110 and a second winding 135*ii* connected to an AC side of AC:DC converter circuit 120. The DC side of each of the DC:AC converter circuit 110 and AC:DC converter circuit 120 may be connected to a DC power source and/or sink, for example an energy storage system or DC electrical network.

Each of the DC:AC converter circuit 110 and the AC:DC converter circuit 120 can take any form suitable for the desired system functionality, and for this reason no circuit structure is shown in FIG. 8A. An example circuits is, however, shown in FIG. 8B, where the DC:AC converter circuit 110 and the AC:DC converter circuit 120 each take the form of an H-bridge circuit. Each H-bridge circuit 110, 120 includes two DC inputs/output/rails, DC+ and DC−, with two half-bridge circuits 111, 112, 121, 122 connected therebetween. Each half-bridge (e.g., half-bridge 111) includes high-side and low-side transistors 111-H, 111-L connected in anti-parallel with a diode, which may be a discrete component or a body diode of the respective transistor. For each H-bridge (e.g., H-bridge 110), the mid-point of the respective half-bridge 111, 112, between the two transistors of the half-bridge, is connected to a respective terminal of a winding 135-*i* of the transformer 135.

The converter circuits 110, 120 could, however, take other forms, for example:

Passive circuits (e.g., one of the converter circuits 110, 120 may be a diode rectifier if only unidirectional power flow is required).

3-phase, 2-level converter circuits, each having six power semiconductor switches. In this case, a 3-phase transformer may be used in the AC link.

3-level neutral point clamped converter circuits.

T-type converter circuits.

Modular Multi-level Converter (MMC) circuits.

Figure 8C:
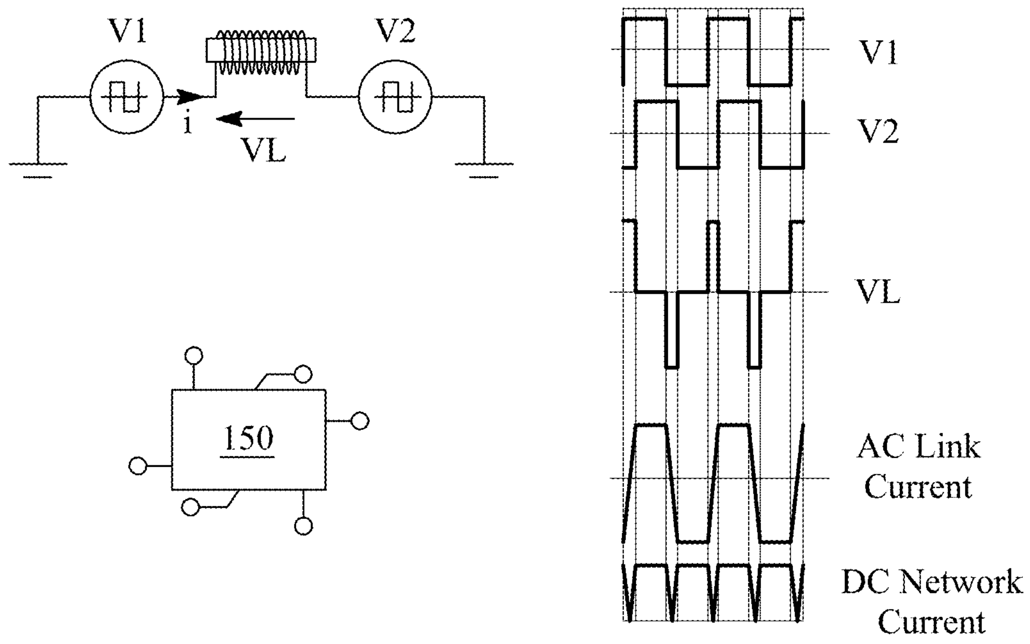
FIG. 8C illustrates the normal operation of a DAB DC:DC converter.

The normal operation of a DAB DC:DC converter 100 under the control of a control system 150 is illustrated in FIG. 8C. The control system 150 supplies, via gate drive circuits (GD), switching signals to the transistors 111-L, 111-H, 112-L, 112-H, 121-L, 121-H, 122-L, 122-H of the converter circuits 110, 120 so that two 50:50 duty cycle square wave voltages $V_1$, $V_2$ are applied to the transformer 135. By applying a suitable phase shift between the two square waves, an alternating voltage waveform $V_L$ is applied across the leakage reactance of the transformer 135. The voltage waveform $V_L$ has a relatively small volt-time area in both the positive and negative directions to control the current in the AC link and power flow between the two DC sides of the converter 100 (e.g., between two DC networks). The application of a small volt-time area and a high switching frequency (e.g., 20 kHz to 70 kHz) limits the required size and weight of the intermediate transformer 135, which is important for aerospace and other transport applications.

Figure 9A:
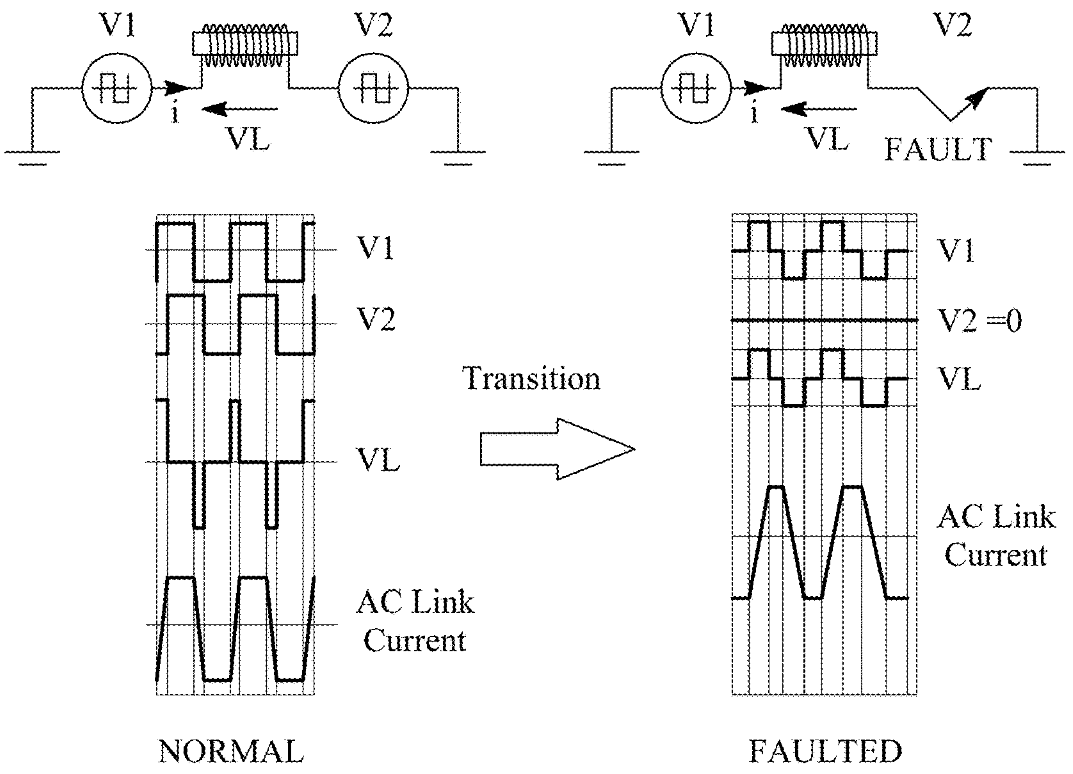
FIG. 9A illustrates how a voltage waveform applied to a winding of a transformer of a DAB DC:DC converter may be modified to control the current supplied by a DAB DC:DC power converter to a faulted DC network.

FIG. 9A illustrates a first example by which the switching operation of the transistors of the DAB DC:DC converter 100 may be controlled to supply a controlled amount of current to the DC network 12 (e.g., for fault discrimination and isolation). The left-hand side of FIG. 9A shows normal operation of the DAB DC:DC converter 100, described above with reference to FIG. 8C. The right-hand side of FIG. 9A shows the fault response when there is a fault in a DC network connected to one side of the converter 100, which without loss of generality is shown to be the right-hand side in FIG. 9A.

When the fault occurs, the voltage $V_2$ collapses to zero or near-zero. The transformer 135 now supports the whole of the alternating voltage $V_1$ produced by the healthy converter circuit 110. If the transistors 121-L, 121-H, 122-L, 122—of the AC:DC converter circuit 120 continue to be switched to produce a 50:50 duty cycle square wave voltage waveform, a fully rectified version of the transformer current is transferred to the faulted network. In other words, the amount of current supplied to the faulted DC network will depend on the AC link current. It is noted that a similar transfer of current can occur if its transistors are turned off, leaving the anti-parallel diodes to conduct instead.

According to the first example, to control the AC link current, the control system 150 responds to the fault by modifying the switching signals supplied to the transistors 111-L, 111-H, 112-L, 112-H so that the voltage $V_1$ applied to the first side of the transformer 135 is a quasi-square wave. Those skilled in the art will appreciate this to mean that the voltage waveform $V_1$ has zero-voltage notches, or portions, between positive and negative voltage portions of waveform, reducing the volt-time area applied to the transformer leakage inductance. In the case of an H-bridge circuit 110, this may be achieved by switching on the two upper transistors or the two lower transistors of the H-bridge 110. By changing the converter switching pattern in this way, the magnitude of the AC link current, and consequently the amount of fault current supplied to the DC network, can be controlled.

Figure 9B:
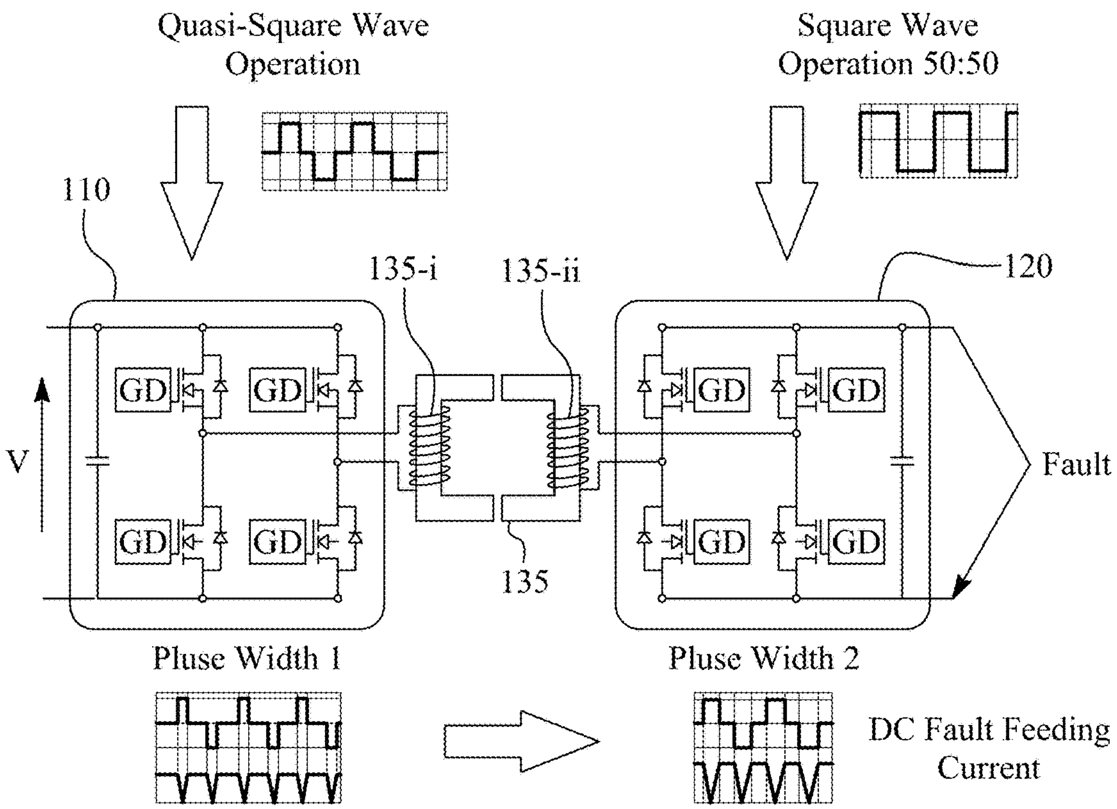
FIG. 9B illustrates how a duty cycle of a voltage waveform applied to a winding of a transformer of a DAB DC:DC converter may be modified to control the current supplied by a DAB DC:DC power converter to a faulted DC network

FIG. 9B illustrates a second example. Here, following the fault, the switching operation of the transistors 111-L, 111-H, 112-L, 112-H of the healthy DC:AC converter circuit 110 is modified so that the pulse width of the voltage waveform $V_1$ changes. As before, this modifies the AC link current and therefore the amount of fault current supplied to the faulted DC network. Therefore, by controlling the pulse width of the voltage $V_1$ applied by the healthy DC:AC converter circuit 110, the amount of fault current is controlled. It can be seen from FIG. 9B that the first and second examples can be used in combination. Specifically, the voltage waveforms at the bottom of FIG. 9B can be seen to have a quasi-square form. Thus, the AC link current can be controlled by changing $V_1$ from square form to quasi-square form, by changing the pulse width or by changing both.

Figure 10:
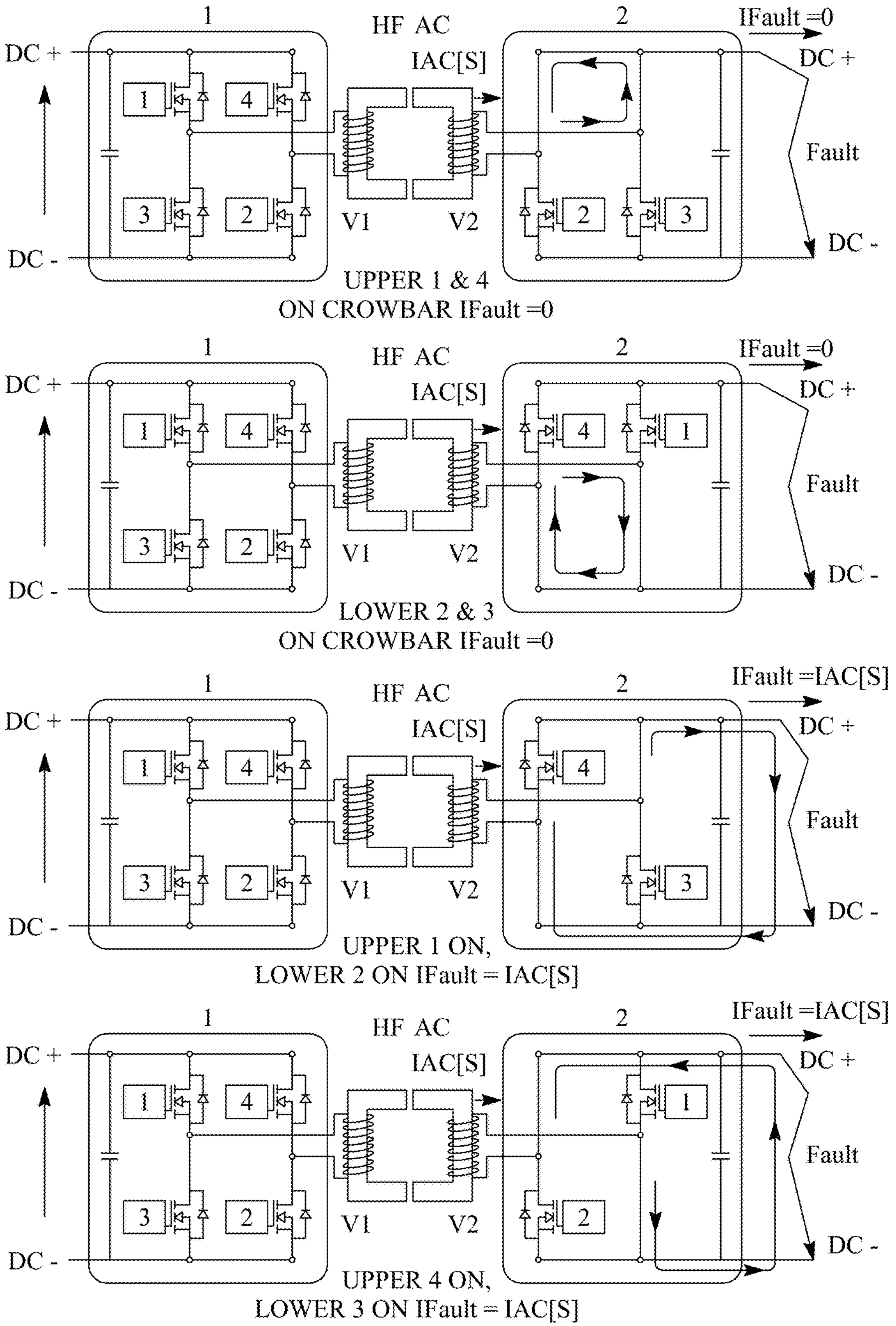
FIG. 10 illustrates four switching which may be used to control the average current supplied by a DAB DC:DC power converter to a faulted DC network.

FIG. 10 illustrates a third example in which the switching operation of the transistors of the converter circuit 120 facing the faulted network is modified in response to the fault. In the third example, the control system 150 responds to the fault by alternately switching the converter circuit facing the fault, i.e., the AC:DC converter circuit 120, between a fault-feeding configuration and a crowbar configuration. In the fault-feeding configuration, the AC:DC converter circuit 120 rectifies the AC link current and transfers it to the faulted DC network. In the crowbar configuration, current from the AC link is contained within (e.g., circulates within) the DC:AC converter circuit 120 so that no current is fed to the faulted DC network. Consequently, the time-averaged amount of current supplied to the faulted DC network is controlled, with the amount depending on the fraction of time spent in the crowbar configuration.

FIG. 10 illustrates possible transistor switching pattern for the fault-feeding configuration and the crowbar configuration for the case where the converter circuit 120 is an H-bridge circuit. FIG. 10 shows that, for each of the fault-feeding configuration and crowbar configuration, there are two possible transistor switching patterns; either or both of which may be utilized. In each fault-feeding configuration, a high-side transistor of a first one of half-bridges and a low-side transistor of a second of the half-bridges are switched on, while a low-side transistor of the first one of the half-bridges and a high-side transistor of the second of the half-bridges are switched off. In each crowbar configuration, either only high-side transistors are switched on (i.e., low-side transistors are switched off) or only low-side transistors are switched on.

While a DAB DC:DC converter 100 with H-bridge circuits is illustrated other converter circuits (e.g., two-level, three-phase circuits) could be used instead. For example, in the case of a two-level, three-phase converter, the fault-feeding configuration would have either two high-side and one low-side transistor switched on or one high-side and two low-side transistors switched on. The crowbar configuration would have only high-side or only low-side transistors switched on.

Figure 11:
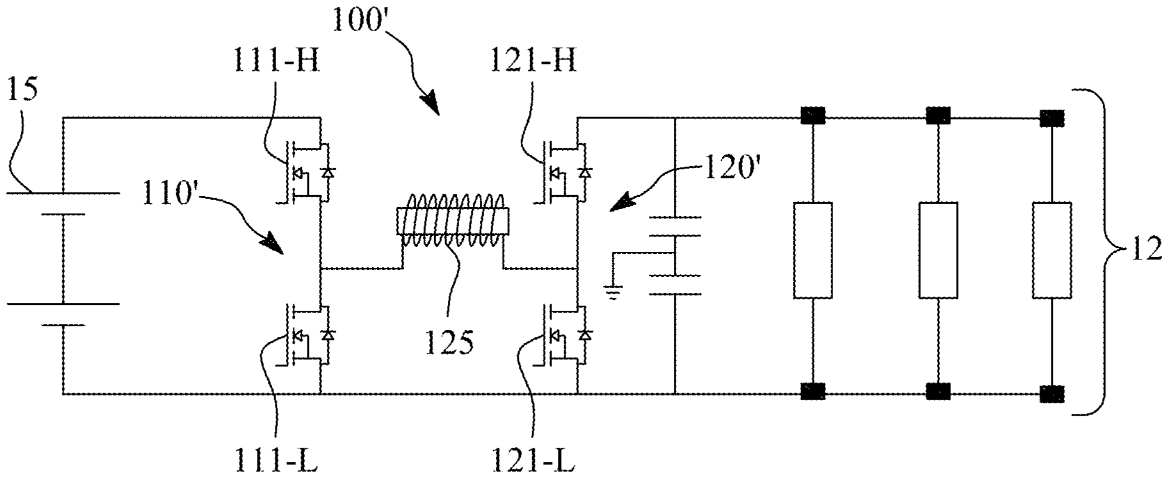
FIG. 11 is a schematic illustration of an H-bridge DC:DC converter.

In another example in accordance with the present disclosure, FIG. 11 illustrates an electrical power system 10 comprising an H-bridge DC:DC power converter 100'. In this example, the H-bridge DC:DC converter 100' is providing an interface between a battery 15 and a DC electrical network 12 (schematically illustrated by three loads). In other examples, the converter 100' could interface between two DC electrical networks having different operating voltages.

The H-bridge DC:DC power converter 100' comprises a first half-bridge circuit 110' and a second half-bridge circuit 120'. Each of the first and second half-bridge circuits 110', 120' includes a low-side transistor 111-L, 121-L and a high-side transistor 111-H, 121-H. Nodes at the mid-points of the two half-bridge circuits 110', 120' (i.e., between the low- and high-side transistors) are connected by an AC link comprising an inductor 125. The high- and low-DC sides of the first half-bridge 110' are connected to the positive and negative terminals of the battery 15. The high- and low-DC sides of the second half-bridge 120' are connected to the positive and negative rails of the DC electrical network 11.

During normal operation of the H-bridge converter 100', the low-side transistor 111-L of the first half-bridge 110' is switched off and the high-side transistor 111-H of the half-bridge 110' is switched on. The low- and high-side transistors 121-L, 121-H of the second half-bridge are switched between a configuration in which the low-side transistor 121-L is switched on and the high-side transistor 121-H is switched off, and a configuration in which the low-side transistor 121-L is switched off and the high-side transistor 121-H is switched on so that the inductor 125 is alternately charged by the battery 15 and discharged to the DC network 12.

Figure 12A:
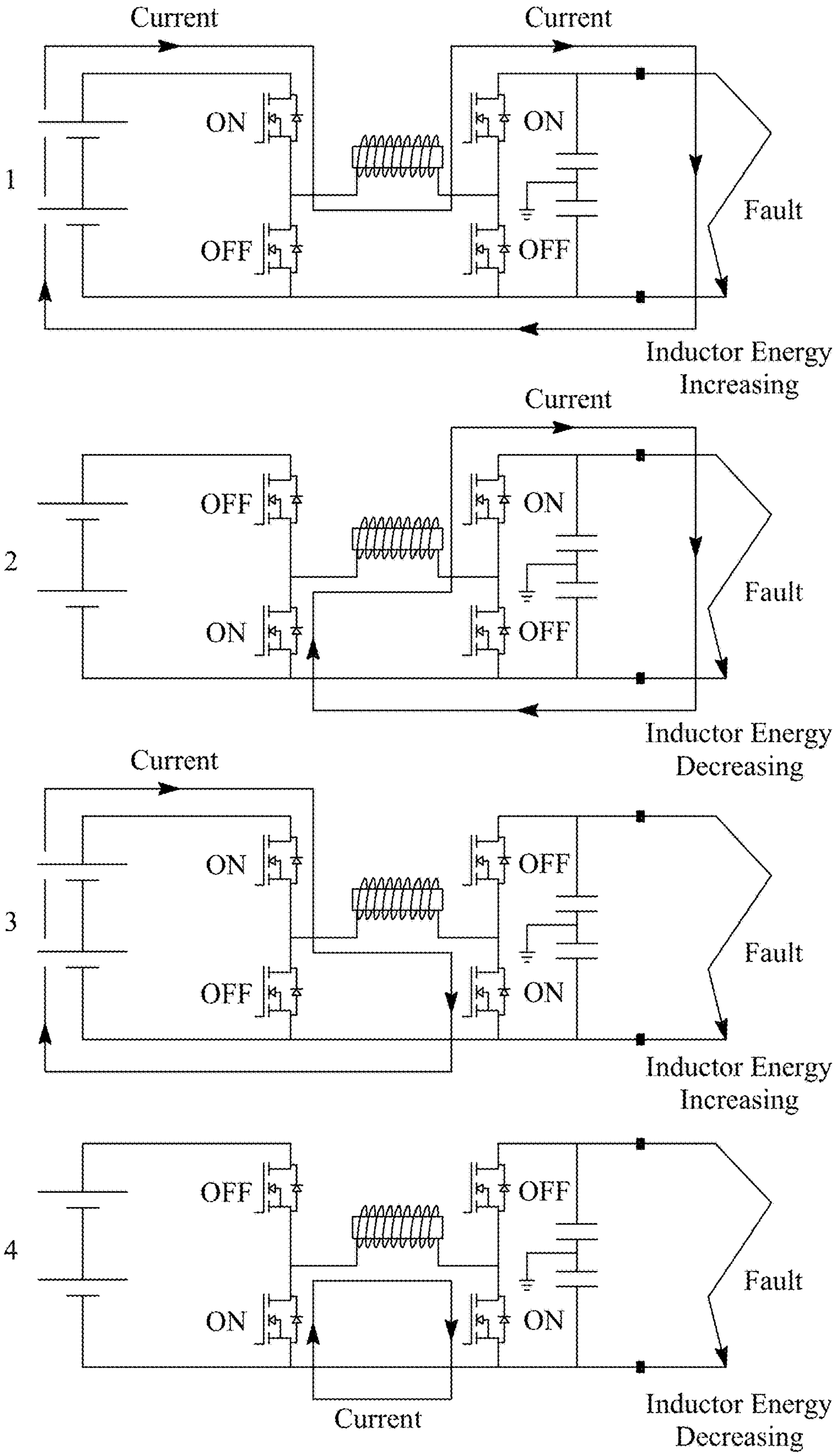
FIG. 12A illustrates four switching which may be used to control the average current supplied by an H-bridge DC:DC power converter to a faulted DC network.

In order to supply a controlled amount (e.g., a gradually increasing amount) of fault current in the presence of a fault in the DC network, the control system 150 repeatedly switches the H-bridge converter 100' between a plurality of different switching configurations for which a different amount of current is supplied from the DC power source (e.g., the battery 15) to the faulted network 12. By controlling the fraction of time that the H-bridge converter 100' is in each configuration, the average amount of current supplied to the DC network is controlled. FIG. 12A illustrates four possible configurations. A further two configurations are described below with reference to FIG. 12B.

Referring to FIG. 12A, in the first configuration, the low-side transistor 111-L of the first half-bridge circuit 110' is switched off, the high-side transistor 111-H of the first half-bridge circuit 110' is switched on, the low-side transistor 121-L of the second half-bridge circuit 120' is switched off, and the high-side transistor 121-H of the second half-bridge circuit 120' is switched on. In the first configuration, fault current is supplied to the faulted DC network and, since the high-side transistor 111-H of the first half-bridge 110' is switched on, the current through the inductor 125 increases.

In the second configuration, the low-side transistor 111-L of the first half-bridge circuit 110' is switched on, the high-side transistor 111-H of the first half-bridge circuit 110' is switched off, the low-side transistor 121-L of the second half-bridge circuit 120' is switched off, and the high-side transistor 121-H of the second half-bridge circuit 120 is switched on. In the second configuration, fault current is supplied to the faulted DC network and, since the high-side transistor 111-H of the first half-bridge 110' is switched off, the current through the inductor 125 decreases (i.e., while in the second configuration, current decays with time constant L/R, L and R being the inductance and resistance of the current path).

In the third configuration, the low-side transistor 111-L of the first half-bridge circuit 110' is switched off, the high-side transistor 111-H of the first half-bridge circuit 110' is switched on, the low-side transistor 121-L of the second half-bridge circuit 120' is switched on, and the high-side transistor 121-H of the second half-bridge circuit 120' is switched off. In the third configuration, fault current is contained within the converter 100' and cannot reach the faulted DC network. Thus, time spent in the third configuration reduces the average current supplied to the DC network. Current through the inductor 125 increases in the third configuration, as the high-side transistor 111-H of the first half-bridge circuit 110' is switched on.

In the fourth configuration, the low-side transistor 111-L of the first half-bridge circuit 110' is switched on, the high-side transistor 111-H of the first half-bridge circuit 110' is switched off, the low-side transistor 121-L of the second half-bridge circuit 120' is switched on, and the high-side transistor 121-H of the second half-bridge circuit 120' is switched off. In the third configuration, fault current is contained within the converter 100' and cannot reach the faulted DC network. Thus, time spent in the third configuration reduces the average current supplied to the DC network. Current through the inductor 125 decreases in the third configuration, as the high-side transistor 111-H of the first half-bridge circuit 110' is switched off.

Figure 12B:
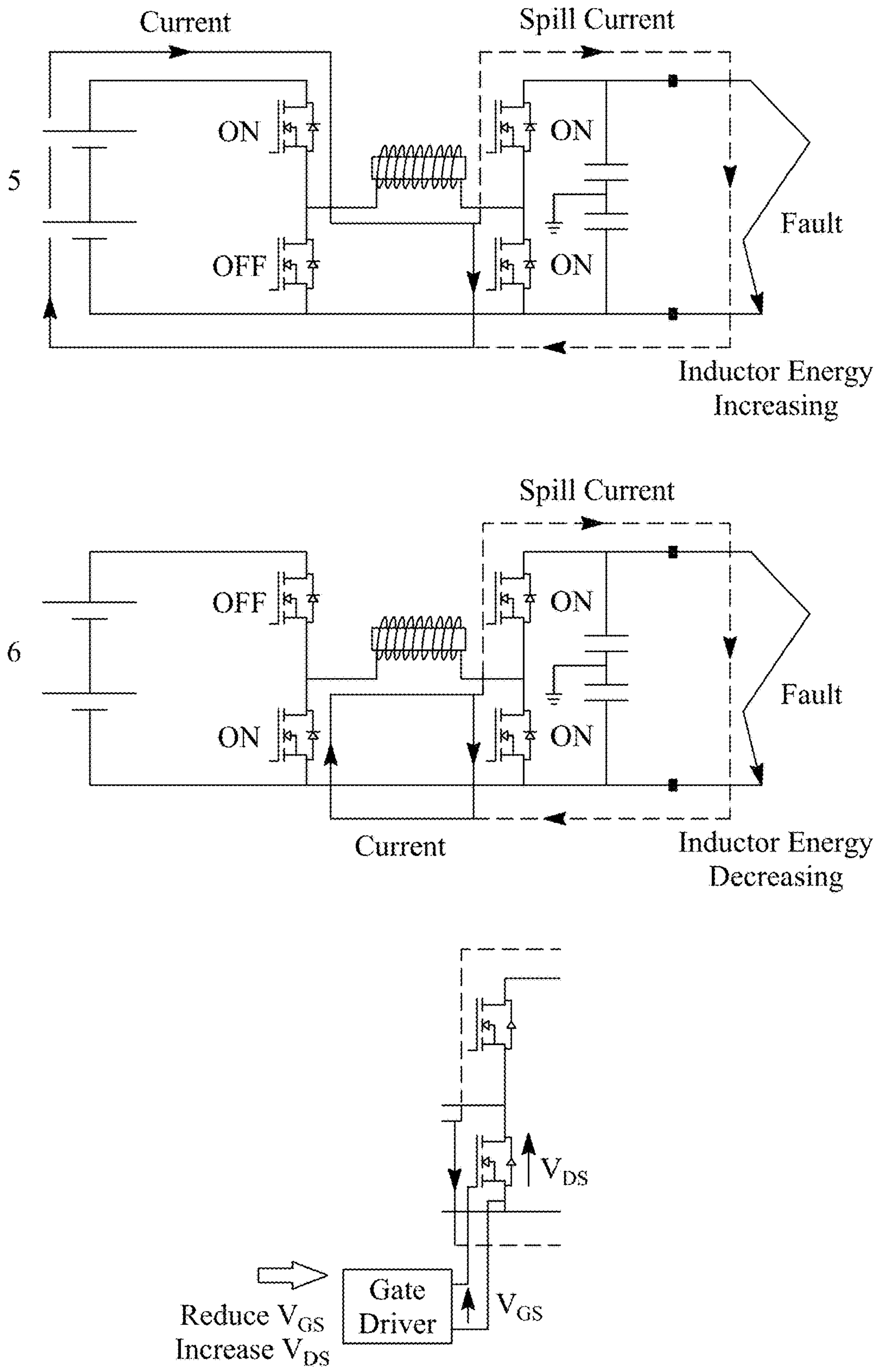
FIG. 12B illustrates a further two switching configurations which may be used to control the average current supplied by an H-bridge DC:DC power converter to a faulted DC network.

Turning to FIG. 12B, this shows two further switching configurations of the H-bridge converter 100', referred to herein as the fifth and sixth configurations. The fifth and sixth configurations may also be referred to as "spill configurations" because they each contain a fraction of the overall fault current within the converter 100' but allow a remaining fraction of the fault current to spill to the faulted DC network 12.

In the fifth configuration, the low-side transistor 111-L of the first half-bridge circuit 110' is switched off, the high-side transistor 111-H of the first half-bridge circuit 110' is switched on, the low-side transistor 121-L of the second half-bridge circuit 120' is switched on, and the high-side transistor 121-H of the second half-bridge circuit 120' is switched on. A fraction of the fault current from the battery 15 is contained via the illustrated freewheeling path (solid lines with arrows) and a remaining fraction of the fault current spills to the DC network (dashed lines with arrows). Since the high-side transistor 111-H of the first half-bridge circuit 110' is switched on in the fifth configuration, the current through the inductor 125 is increasing.

In the sixth configuration, the low-side transistor 111-L of the first half-bridge circuit 110' is switched on, the high-side transistor 111-H of the first half-bridge circuit 110' is switched off, the low-side transistor 121-L of the second half-bridge circuit 120' is switched on, and the high-side transistor 121-H of the second half-bridge circuit 120' is switched on. A fraction of the fault current from the battery 15 is contained via the illustrated freewheeling path (solid lines with arrows) and a remaining fraction of the fault current spills to the DC network (dashed lines with arrows). Since the high-side transistor 111-H of the first half-bridge circuit 110' is switched off in the sixth configuration, the current through the inductor 125 is decreasing.

To access the spill configurations (i.e., the fifth and sixth configurations), it is necessary that the parallel-connected diode associated with the high-side transistor 121-H of the second half-bridge circuit 120' becomes forward biased. This happens if the voltage developed across the low-side transistor 121-L exceeds the forward voltage drop of the diode, which is typically only about 2-3 V. Whether or not this condition is met depends on the level of current and the gate driver. For SiC MOSFETs, the selection of the device and its drain-source resistance, $R_{DS\text{-}on}$, combined with a higher than rated current (e.g., 1.5 per-unit) should enable the condition to be met in all relevant circumstances. However, an additional or alternative approach—shown in the right-hand side of FIG. 12B—is to temporarily reduce the gate-source voltage, $V_{GS}$, of the low-side transistor 121-L which increases its $R_{DS\text{-}on}$ and thus the voltage available to force the upper diode into conduction. Whilst increasing $R_{DS-on}$ in this way is usually inadvisable because it inherently increases the power losses in the transistor 121-L, it should be acceptable for the short period of time contemplated for fault discrimination and/or isolation.

Figure 12C:
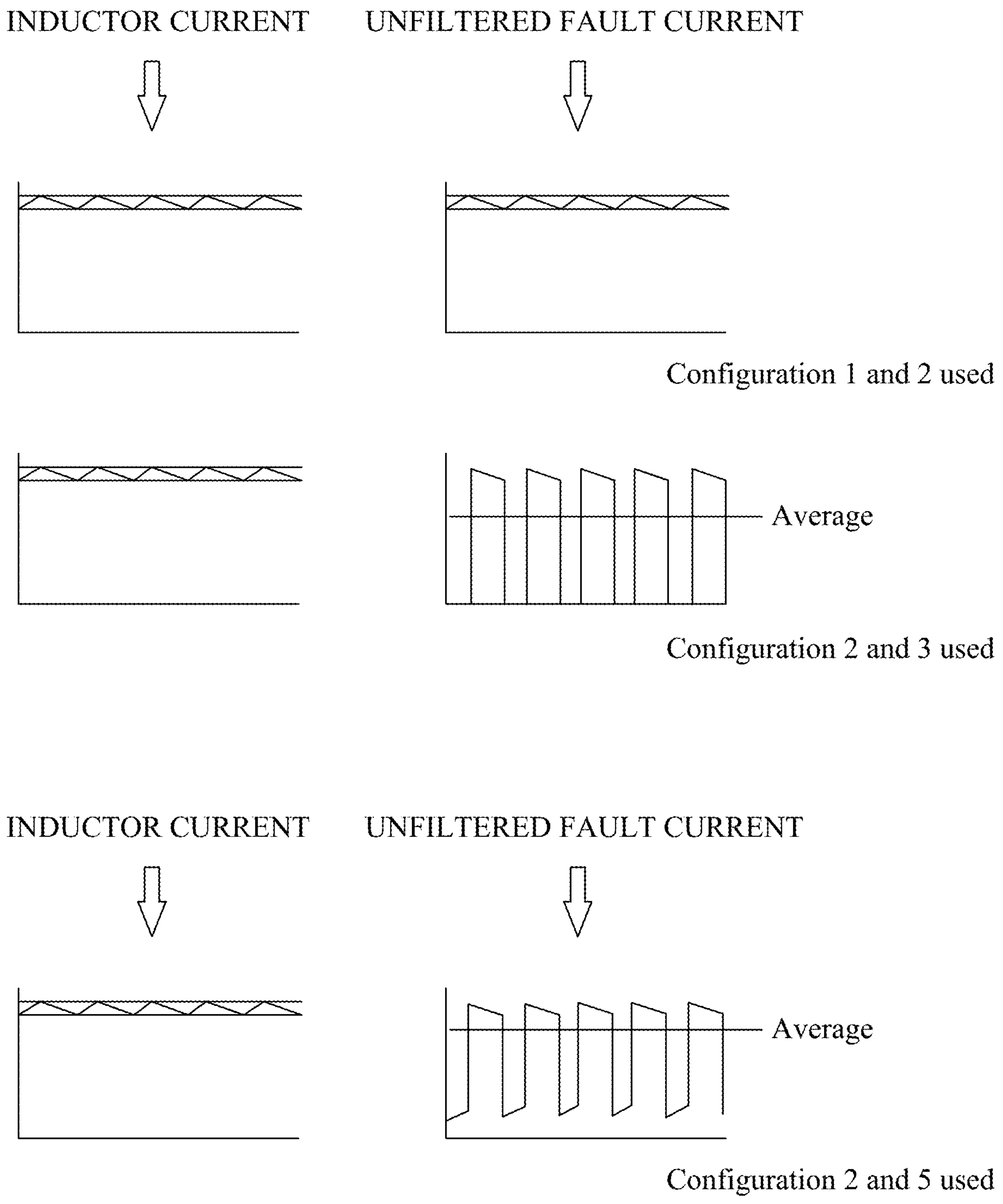
FIG. 12C illustrates how the average current supplied to the faulted DC network may be changed by switching between different switching configurations.

FIG. 12C illustrates example current waveforms that may be produced by repeatedly switching the transistors of the H-bridge converter 100' between two of the six configurations of FIGS. 12A and 12B. In the first example, the control system 150 switches the converter 100' between the first configuration and the second configuration. In the second example, the control system 150 switches the converter 100' between the second configuration and the third configuration. In the third example, the converter 100' is repeatedly switching between the second configuration and the fifth configuration. The waveform of the current through the inductor 125 is shown in the left-hand plot and an unfiltered version of the current waveform supplied to the faulted DC network is shown in the right-hand plot.

In the first example, fault current is supplied from the left-hand side of the converter 100' (e.g., from a battery 15) to the DC network in both the first and second configurations. However, the amount of current increases when the converter 100' is in the first configuration but decreases when the converter 100' is in the second configuration. The average amount of current will therefore depend on the fraction of time spent in the second configuration: the greater the fraction of time the converter 100' is the second configuration, the lower the average current will be. In this example, the control system 150 controls the converter 100' so that it spends approximately twice as long in the second configuration as the first configuration (i.e., the converter 100' is in the first configuration for one third of the time and in the second configuration for two thirds of the time). If more time was spent in the second configuration, the average current would be lower and vice versa.

In the second example, current is supplied to the DC network in the second configuration but contained within the converter 100' in the third configuration. The average amount of current supplied to the DC network will therefore be greater than zero but less than the current supplied to the converter in the second configuration. This is shown by the line labelled "Average". The actual value will depend on the fraction of time spent in the third configuration: the greater the fraction of time the converter 100' is the third configuration, the lower the average current will be. In this example, the control system 150 controls the converter 100' so that it spends approximately twice as long in the third configuration as the second configuration (i.e., the converter 100' is in the second configuration for one third of the time and in the third configuration for two thirds of the time). If more time was spent in the third configuration, the average current would be lower and vice versa.

In the third example, the converter 100' starts in the fifth configuration, where only a fraction of the fault current spills to the network and the current through the inductor 125 is increasing. The converter 100' is then switched to the second configuration, where the full (or substantially full) fault current is supplied to the DC network and the current through the inductor 125 is decreasing. The average amount of current, shown by the line labelled "Average", is therefore greater than the fraction of current that spills to network in the fifth configuration but lower than the amount of fault current supplied to the fault site in the second configuration. The average amount of current may be adjusted by controlling a respective fraction of time the converter 100' is in the second and fifth configurations. The greater the fraction of time the converter 100' is in the fifth configuration, the lower the average current and vice versa.

In each of the above examples, the converter 100 is repeatedly switched between two of the six described configurations. These examples are not intended to be limiting: two or more than two of the six configurations may be used, and different combinations of configurations may be used. Any one or more of the following may be considered:

To prevent the inductor 125 being continuously energized, which could lead to loss of control of the current level, the two more or configurations should include at least one of the second, fourth and sixth configurations (i.e., at least one of the configurations in which the inductor current is decreasing).

To prevent the controlled amount of current continuously decaying towards zero where this is not desired (e.g., where fault discrimination and isolation is still in progress), the two more or configurations should include at least one of the first, third and fifth configurations (i.e., at least one of the configurations in which the inductor current is increasing).

To prevent an average current of zero being supplied to the DC network 11, the two or more configurations should not consist solely of the third and fourth configurations.

The six configurations may be split into three groups, shown below, and the two or more configurations may include a configuration from at least two different groups.

Group 1: Configurations 1 and 2
Group 2: Configurations 3 and 4
Group 3: Configurations 5 and 6

The two or more configurations may then include a configuration from at least two different groups, and optionally a configuration from all three groups.

The repeated switching between the different configurations may or may not be a repeating pattern. Where a repeating pattern is used, each configuration may be used only once or more than one per cycle of the pattern. For example, where configurations 1, 2, 3 and 4 are used, possible repeating patterns include (1-2-3-4)-(1-2-3-4)-(1-2-3-4) . . . and so forth, or (1-2-3-4-3-2)-(1-2-3-4-3-2)- . . . and so forth.

As explained above, the present disclosure may be implemented in an aircraft electrical power system. Exemplary power and propulsion systems are shown in FIGS. 13A-13C.

Figure 13A:
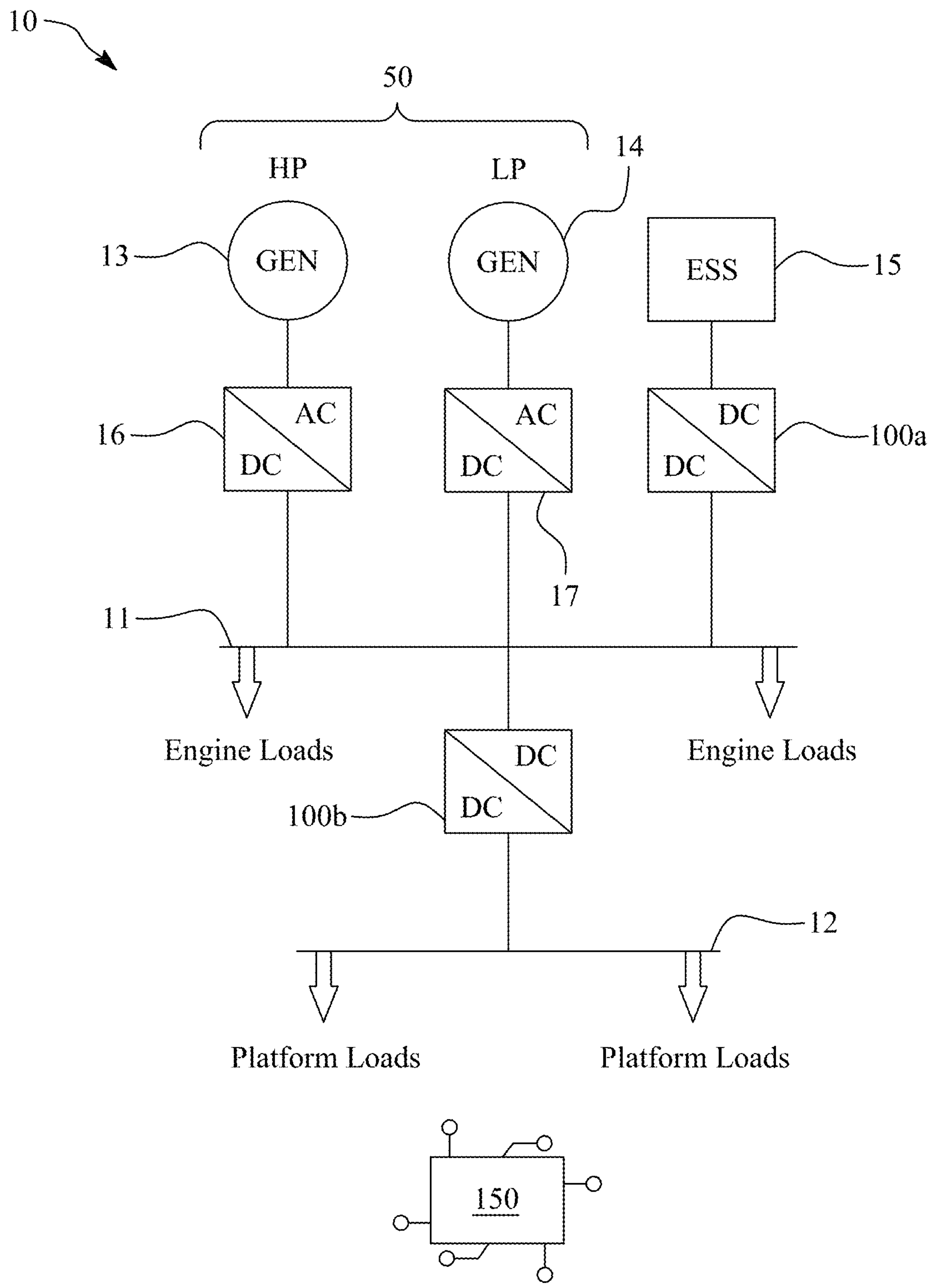
FIG. 13A is a schematic diagram of an aircraft power and propulsion system that includes DC:DC converters.

FIG. 13A illustrates an electrical power system 10 of an aircraft. The electrical power system 10 includes two DC networks: a first, higher voltage (e.g., 540 $V_{dc}$), DC network 11 that supplies power to electrical loads associated with a gas turbine engine 50 and a second, lower voltage (e.g., 270 $V_{dc}$), DC network 12 that supplies platform electrical loads. The first DC network 11 is supplied with power, via rectifiers 16, 17, from first and second electrical generators 13, 14 that are coupled to the high-pressure (HP) and low-pressure (LP) spools of the gas turbine engine 50. The first DC network is also supplied with power by an energy storage system, ESS, 15, and a first DC:DC power converter 100*a* is connected between the terminals of the ESS 15 and the first DC network 11 to account for variation in the terminal voltage of the ESS 15 as it charges and discharges. A second DC:DC power converter 100*b* is connected between the first and second DC networks 11, 12 for power exchange therebetween. Depending on the configuration of the DC:DC converters 100*a*, 100*b*, power flow may unidirectional or bidirectional. The system further includes a control system 150, as described previously.

Figure 13B:
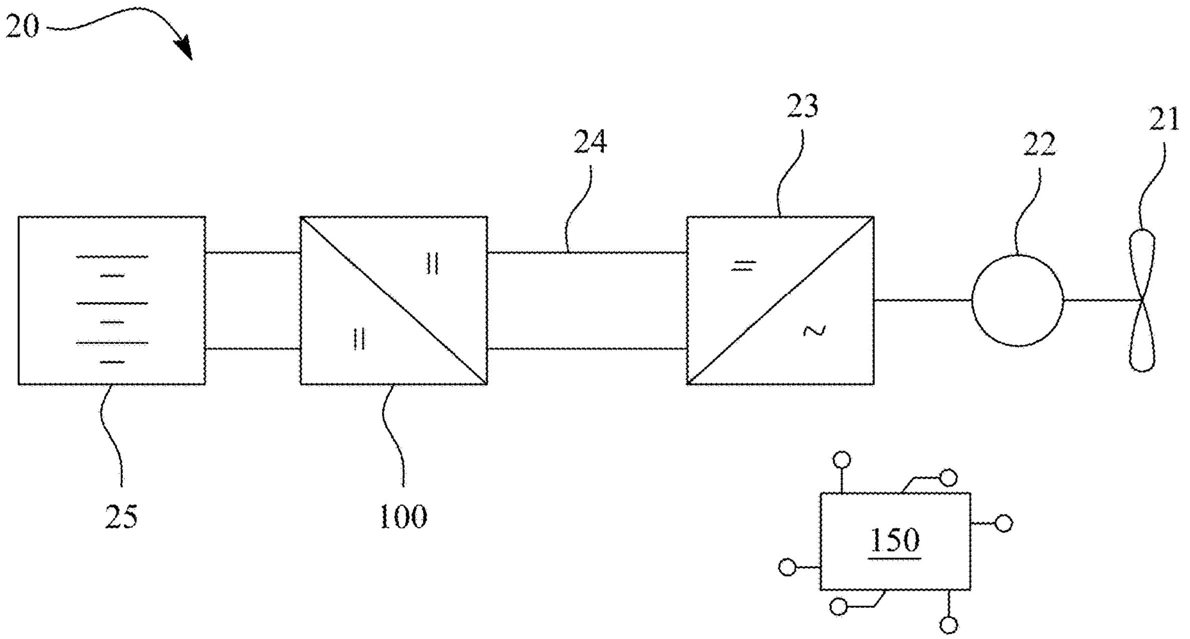
FIG. 13B is a schematic illustration of an electric aircraft propulsion system.
Figure 13C:
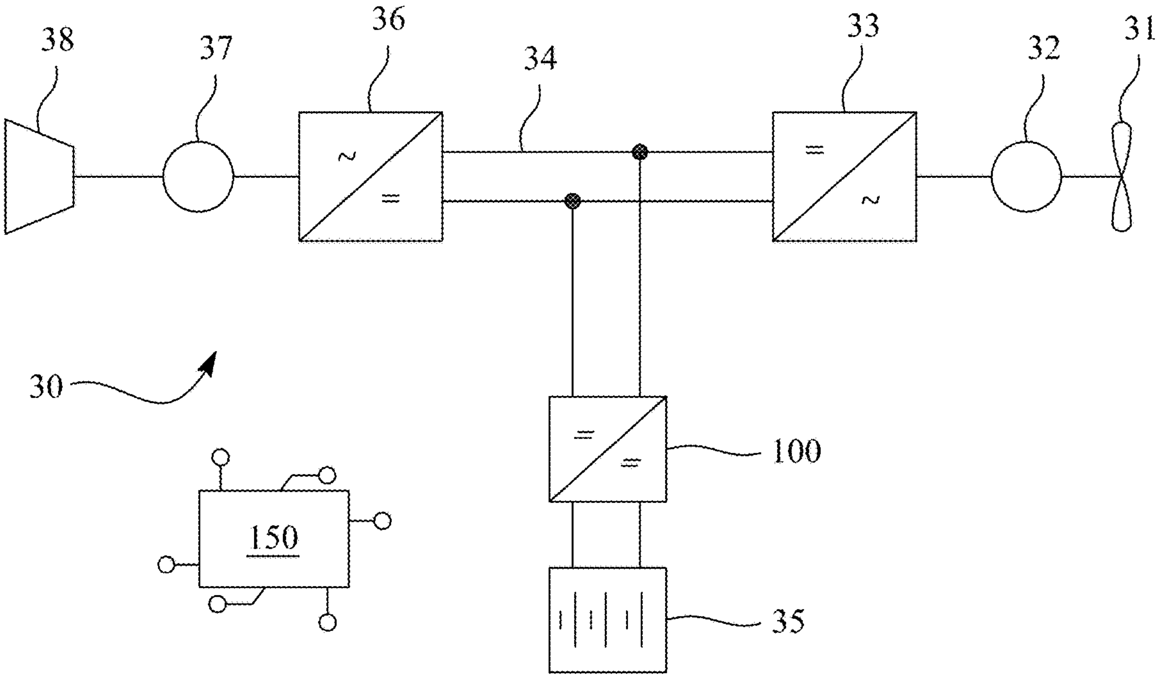
FIG. 13C is a schematic illustration of a hybrid electric aircraft propulsion system.

FIG. 13B shows, in schematic form, a purely electrical power and propulsion system 20 of an aircraft. The system 20 includes a propulsor 21 (e.g., a propeller or fan), whose rotation is driven by an electrical machine 22. The electrical machine 22 receives electrical power from a DC network 24 via a DC:AC power converter 23. The DC network 24 is supplied with power by an energy storage system 25. A DC:DC converter 100 provides an interface between the energy storage system 25 and the DC network 24. Control of the system is performed by the control system 150.

FIG. 13C shows, again in schematic form, a hybrid electrical power and propulsion system 30 of an aircraft. The system 30 includes a propulsor 31 whose rotation is driven by an electrical machine 32. The electrical machine 32 receives electrical power from a DC network 34 via a DC:AC power converter 33. The DC network 34 is supplied with power by two sources: an energy storage system 35 and a generator set including a gas turbine engine 38, an electrical generator 37 coupled to a shaft of the gas turbine engine 37 and a rectifier 36. A DC:DC converter 100 provides an interface between the energy storage system 35 and the DC network 34. The DC:DC converter 100 may be bidirectional to facilitate charging of the energy storage system 35 using power from the generator set, in addition to discharge of the battery to the DC network 34. Control of the system is performed by the control system 150. Those skilled in the art will recognise the propulsion system 30 of FIG. 13C to be of the series hybrid type. Other hybrid electric propulsion systems are of the parallel type, while still others are of the turboelectric type or have features of more than one type.

Figure 14A:
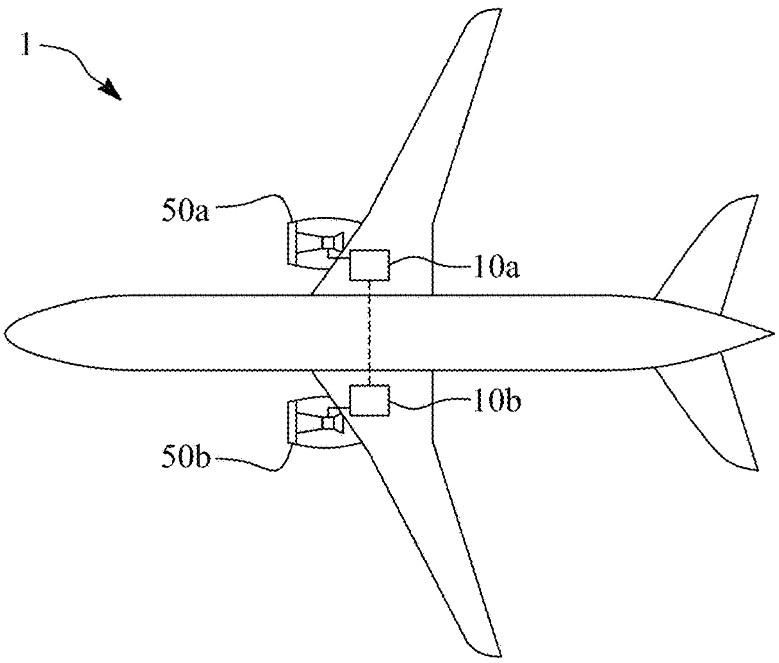
FIG. 14A is a plan view of an aircraft.

FIG. 14A shows an aircraft 1 that includes first and second gas turbine engines 50*a*, 50*b*. The engines 50*a*, 50*b* are associated with electrical power systems 10*a*, 10*b*, which may of the type shown in FIG. 13A or a variant thereof. As illustrated by the dotted lines, the electrical power systems 10*a*, 10*b* may be connected. For example, each electrical power system 10*a*, 10*b* may have a platform DC electrical network 12 and these may be connected or connectable via bus ties. The gas turbine engines may be of any suitable configuration, for example they may be two-spool, three-spool or geared turbofans having one, two or more shaft-coupled electrical machines 13, 14.

Figure 14B:
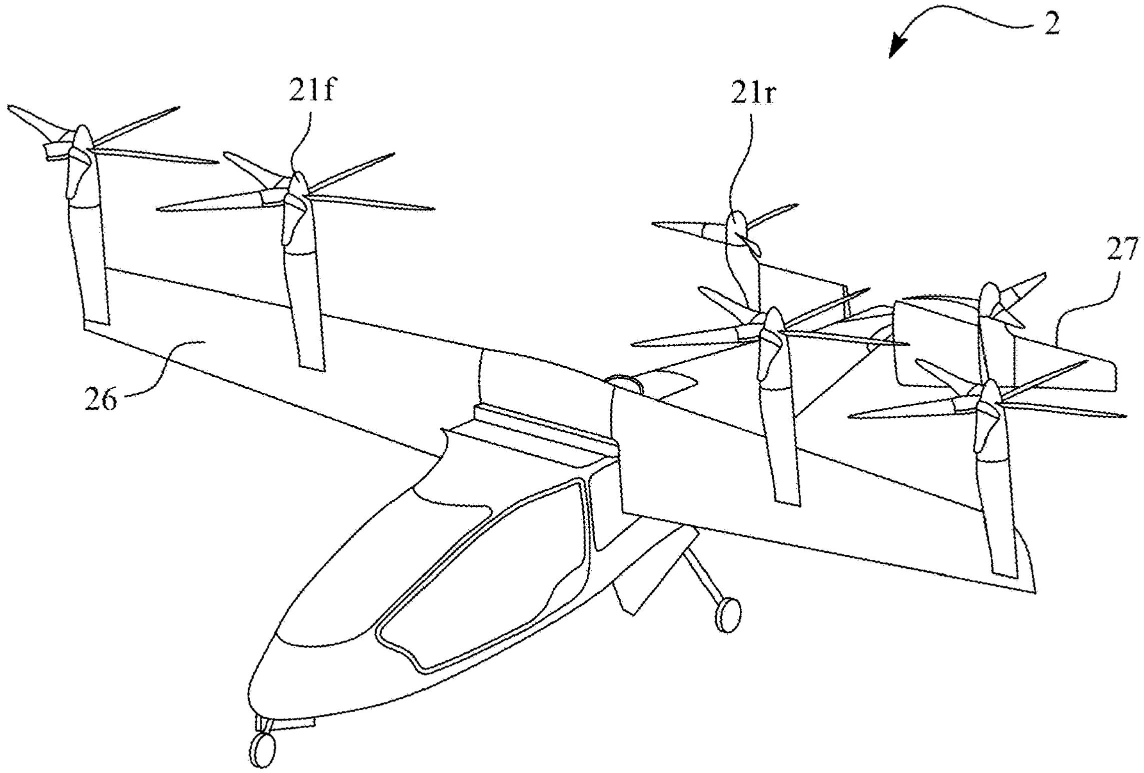
FIG. 14B is a perspective view of a vertical take-off and landing (VTOL) aircraft.

FIG. 14B shows a vertical take-off and landing (VTOL) aircraft. The VTOL aircraft has an electric or hybrid electric power and propulsion system, for example of the types shown in FIGS. 13B and 13C. In this exemplary configuration, the VTOL aircraft has front propulsors 21*f* coupled to a front flight surface and rear propulsors 21*r* coupled to a rear flight surface. The flight surfaces 26, 27 are capable of tilting between a lift configuration (shown) and a forward flight configuration in which the propulsors 21*f*, 21 *r* face forward. In other examples, the propulsors 21*f*, 21*r* may instead tilt relative to fixed flight surfaces 26, 27.

Figure 15:
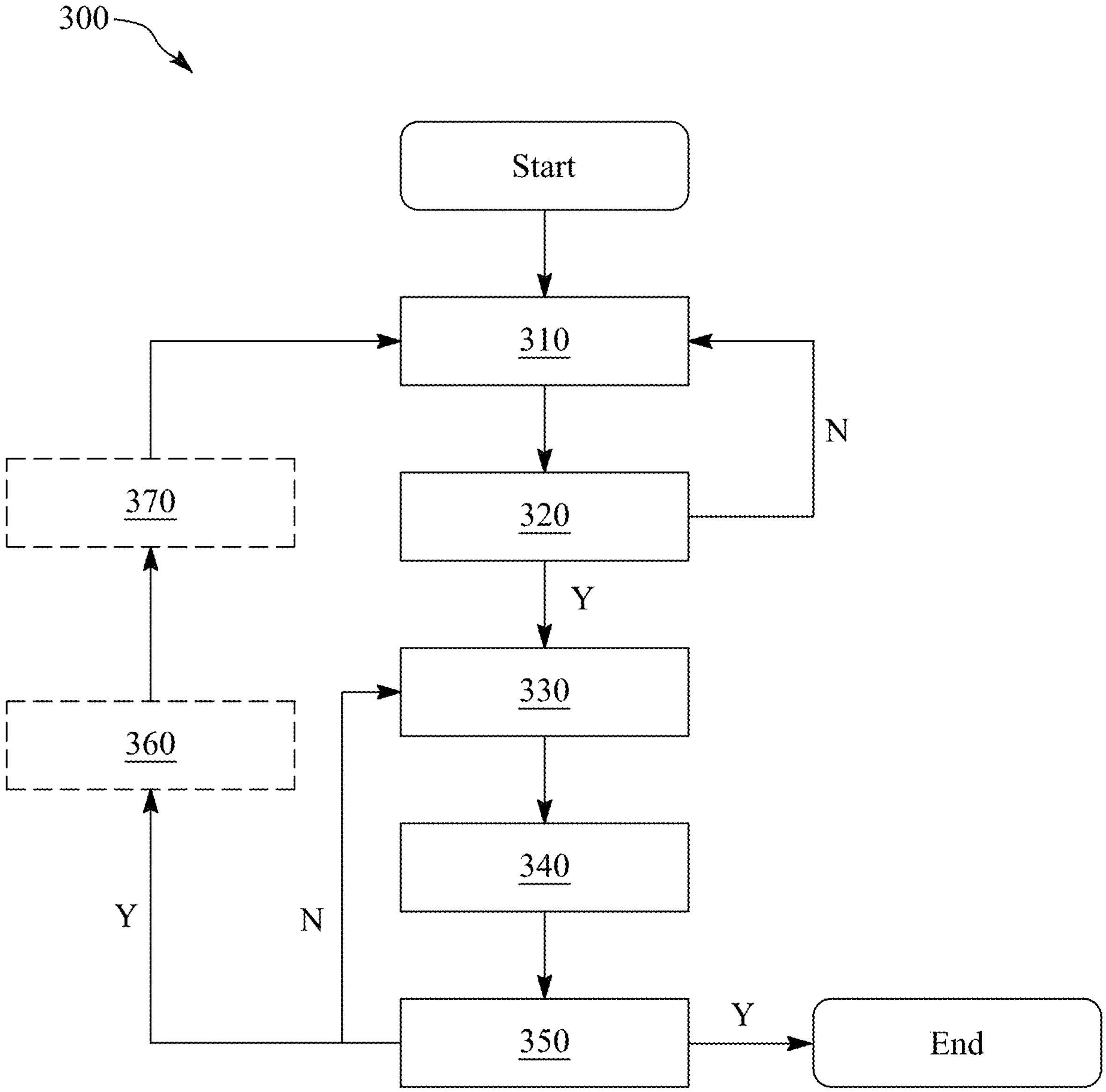
FIG. 15 is a flow chart of a method of operating an electrical power system.

FIG. 15 is a flow chart illustrating a method 300 of operating an electrical power system. The electrical power system may be an aircraft electrical power system, for example one of the types shown in FIGS. 13A-13C. Alternatively, it may be an electrical power system for another transport application (e.g., a vehicle, ship or train) or of a non-transport application. The DC:DC converter, which may be of the DAB type 100 or H-bridge type 100', is connected, at one side, to a DC power source, for example an energy storage system (e.g., ESS 15) or a DC electrical network (e.g., DC network 11). Another DC side of the DC:DC converter 100, 100' is connected to a DC electrical network (e.g., DC network 12). The method 300 may take place under the control of a control system 150, which may take any desired form suitable for the application, e.g., a distributed control system or a single controller.

At the start of the method 300, the electrical power system is operating in a normal condition. In other words, it is functioning as intended with no faults. The control system 150 controls a switching state of the transistors of the DC:DC converter to, for example, match the terminal voltage of the DC power source (e.g., ESS 15 or DC network 11) to the terminal voltage of the DC network (e.g., DC network 12).

At 310, the control system 150 monitors one or more operating parameters of the electrical power system. For example, the control system 150 may monitor the voltage across the output terminals of the DC:DC converter that face the DC electrical network, or it may monitor one or more other voltages or currents in the DC electrical network.

At 320, the control system 150 determines, based on the one or more operating parameters, whether there is a fault in the DC electrical network. For example, the control system 150 may monitor the one or more operating parameters for changes indicative of a fault. In one example, the control system determines whether there is a fault based on whether there is a sudden drop in the voltage across the output terminals of the DC:DC converter. If no fault is detected ("N"), the method proceeds back to 310 and the control system continues to monitor the one or more operating parameters. If the control system 150 determines there is a fault ("Y"), the method proceeds to 330.

At 330, the control system 150 controls a switching operation of a plurality of transistors of the DC:DC power converter to supply a controlled and gradually increasing amount of current from the DC power source to the DC electrical network. For example, where the DC:DC converter is a DAB DC:DC converter 100 as shown in FIG. 8A, the control system 150 may implement the current control techniques described with reference to FIGS. 9A, 9B and/or FIG. 10. If the DC:DC converter is of the H-bridge type as illustrated in FIG. 11, the control system 150 may implement the current control techniques described with reference to FIGS. 12A to 12C. The control system 150 may linearly or non-linearly increase the current, from zero or from a non-zero value.

At 340, the control system 150 controls the opening of controllable circuit breakers in the DC network 12 based on pre-defined circuit breaker trip profiles and the gradually increasing amount of current supplied to the DC electrical network. In particular, when the increasing amount of current from step 330 reaches a level defined by a trip profile, the control system 150 opens the corresponding circuit breaker. In some examples, the control system 150 may effectively ignore a high initial current caused by capacitor discharge, as described above with reference to FIG. 4. In some examples, prior to opening the circuit breaker, the control system 150 blocks the supply of current, or reduces the amount of current supplied, to the DC network 12 to e.g., prevent contactor arcing, as described above with reference to FIGS. 5A-5B.

At 350, the control system 150 determines whether the opening of the contactor 340 has isolated the fault. For example, the control system 150 may continue to monitor one or more operating parameters as in step 310. If, for example, the network voltage rises after opening the contactor at 340, the control system determines the fault is isolated ("Y") and the method 300 either ends or proceeds to optional step 360. If, e.g., the network voltage does not change, the control system 150 determines the fault has not been isolated ("N"), the method returns to step 330.

At step 330, the control system 150 continues to increase the current supplied to the DC network 12 via the DC:DC converter. The method proceeds to step 340. At 340, when the increasing amount of current from step 330 reaches a level defined by another trip profile, the control system 150 opens the corresponding circuit breaker. The method proceeds to 350, where again the control system 150 determines whether the opening of the circuit breaker at step 340 has isolated the fault. The loop is repeated until the fault is isolated and method either ends or proceeds to optional step 360.

At optional step 360, having isolated the fault, the control system 150 blocks all current from being supplied from the cleared DC network, for example by turning of all of the transistors of the DC:DC converter. In some examples, step 360 may be omitted and proceed straight to step 370, for example where an already low or zero current was being supplied to the DC network.

At 370, the control system 150 prepares the electrical power system for a restart by recharging one or more capacitors that have discharged a consequence of the fault. To do so, the control system 150 controls the DC:DC converter to supply a controlled, low current to the DC network to charge the capacitor(s).

Having charged the capacitor(s), the electrical power system restarts and begins normal operation. The method 300 therefore proceeds back to 310 where the control system 150 monitors and provides normal control of the system.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It will also be appreciated that whilst the invention has been described with reference to aircraft and aircraft propulsion systems, the techniques described herein could be used for many other applications. These include, but are not limited to, automotive, marine and land-based applications.

We claim:

1. An electrical power system comprising: a DC:DC power converter connected between a DC power source and a DC electrical network, the DC electrical network comprising at least a first zone for powering a first group of one or more electrical loads, a second zone for powering a second group of one or more electrical loads, a first controllable circuit breaker, and a second controllable circuit breaker, wherein the electrical power system further comprises a control system configured to:

monitor one or more operating parameters of the electrical power system and to determine, based on the one or more operating parameters, whether there is a fault in the DC electrical network;

in response to determining there is a fault in the DC electrical network:

control a switching operation of a plurality of transistors of the DC: DC power converter to supply a controlled and gradually increasing amount of current from the DC power source to the DC electrical network;

open the first controllable circuit breaker if the gradually increasing amount of current supplied to the DC electrical network reaches a level defined by a first trip profile, the first trip profile defining a gradually decreasing current level;

open the second controllable circuit breaker if the gradually increasing amount of current supplied to the DC electrical network reaches a level defined by a second trip profile, the second trip profile defining a gradually decreasing current level, the gradually decreasing current level defined by the first trip profile being higher than the gradually decreasing current level defined by the second trip profile.

2. The electrical power system of claim 1, wherein the control system is further configured to, if the gradually increasing amount of current supplied to the DC electrical network reaches a level defined by the first or second trip profile, control the plurality of transistors of the DC: DC power converter to reduce the amount of current supplied to the DC electrical network before opening the first or second controllable circuit breaker.

3. The electrical power system of claim 2, wherein the control system is configured block the supply of current from the DC power source to the DC electrical network before opening the first or second controllable circuit breaker.

4. The electrical power system of claim 1, wherein:

the first controllable circuit breaker is located between the first zone and the DC: DC power converter;

the second controllable circuit breaker is located between the first zone and the second zone.

5. The electrical power system of claim 1, wherein the control system is further configured to, after opening the second controllable circuit breaker:

determine, based on the one or more operating parameters of the electrical power system, whether the fault in the DC electrical network has been isolated.

6. The electrical power system of claim 5, wherein the control system is further configured to, in response to determining the fault in the DC electrical network has been isolated:

control the switching operation of the plurality of transistors of the DC: DC power converter to supply a controlled amount of current from the DC power source to the DC electrical network to charge one or more capacitors of the DC electrical network.

7. The electrical power system of claim 6, wherein the control system is further configured to, before supplying the controlled amount of current from the DC power source to the DC electrical network to charge the one or more capacitors, control the plurality of transistors of the DC: DC power converter to block the supply of current from the DC power source to the DC electrical network.

8. The electrical power system of claim 5, wherein the control system is further configured to, in response to determining the fault in the DC electrical network has not been isolated:

control the switching operation of the plurality of transistors of the DC: DC power converter to supply a gradually increasing amount of current from the DC power source to the DC electrical network; and open the first controllable circuit breaker if the gradually increasing amount of current supplied by the DC power source reaches a level defined by the first trip profile.

9. The electrical power system of claim 1, wherein controlling the plurality of transistors to supply a controlled amount of current from the DC power source to the DC electrical network comprises:

repeatedly switching the DC: DC power converter between two or more different switching configurations of the DC: DC power converter to control an average amount of current transferred from the DC power source to the DC electrical network.

10. The electrical power system of claim 9, wherein the control system is configured to control an amount of time the DC: DC power converter is in each of the two or more different switching configurations to control the average amount of current transferred from the DC power source to the DC electrical network.

11. The electrical power system of claim 1, wherein the DC: DC power converter is a Dual Active Bridge (DAB) DC: DC power converter or an H-bridge DC: DC power converter.

12. The electrical power system of claim 1, wherein:

the DC: DC power converter is a Dual Active Bridge (DAB) DC: DC power converter comprising a DC: AC converter circuit having a DC and an AC side; an AC: DC converter circuit having a DC side and an AC side; and an AC link connecting the AC side of the DC: AC circuit and the AC side of the AC: DC converter circuit, the AC link including a transformer having a first winding connected to the AC side of the DC: AC converter circuit and a second winding connected to the AC side of the AC: DC converter;

the DC side of the DC: AC converter circuit is connected to the DC power source;

the DC side of the AC: DC converter circuit is connected to the DC electrical network;

controlling the plurality of transistors to supply a controlled amount of current from the DC power source to the DC electrical network comprises one or more of:

modifying a switching operation of a plurality of transistors of the DC: AC converter circuit so that a waveform of a voltage applied to the first winding of the transformer changes from a square wave to a quasi-square wave; and modifying the switching operation of the first plurality of transistors so that a duty cycle of a waveform of a voltage applied to the first winding of the transformer changes.

13. The electrical power system of claim 1, wherein the one or more operating parameters of the electrical power system includes a voltage of the DC electrical network, and the control system is configured to determine there is a fault in the DC electrical network in response to a drop in the voltage.

14. The electrical power system of claim 1, wherein the first and second controllable circuit breakers comprise mechanical contactors or semiconductor switches.

15. The electrical power system of claim 1, wherein the DC power source comprises an energy storage system or a second DC electrical network.

16. An aircraft comprising an electrical power system according to claim 1.

17. A method of operating an electrical power system, the electrical power system comprising: a DC:DC power converter connected between a DC power source and a DC electrical network, the DC electrical network comprising at least a first zone for powering a first group of one or more electrical loads, a second zone for powering a second group of one or more electrical loads, a first controllable circuit breaker and a second controllable circuit breaker, the method comprising:

monitoring one or more operating parameters of the electrical power system;

determining, based on the one or more operating parameters, that there is a fault in the DC electrical network;

controlling a switching operation of a plurality of transistors of the DC: DC power converter to supply a controlled and gradually increasing amount of current from the DC power source to the DC electrical network; and controlling the opening of the first and second controllable circuit breakers according to respective first and second trip profiles, wherein the first and second trip profiles define gradually decreasing current levels, and the control system opens the first controllable circuit breaker if the gradually increasing amount of current supplied to the DC electrical network reaches a level defined by the first trip profile, and the control system opens the second controllable circuit breaker if the gradually increasing amount of current supplied to the DC electrical network reaches a level defined by the second trip profile, wherein the gradually decreasing current level defined by the first trip profile being higher than the gradually decreasing current level defined by the second trip profile.

18. The method of claim 17, further comprising:

in response to the gradually increasing amount of current supplied to the DC electrical network reaching the level defined by the second trip profile, before opening the second controllable circuit breaker, controlling the switching operation of the plurality of transistors of the DC: DC power converter to block the supply of current from the DC power source to the DC electrical network.

19. The method of claim 17, further comprising, after opening the first or second controllable circuit breaker:

controlling the switching operation of the plurality of transistors of the DC: DC power converter to supply a controlled amount of current from the DC power source to the DC electrical network to charge one or more capacitors of the DC electrical network.

20. The method of claim 19, further comprising, after opening the first or second controllable circuit breaker and before controlling the switching operation of the plurality of transistors of the DC: DC power converter to supply a controlled amount of current from the DC power source to the DC electrical network to charge one or more capacitors of the DC electrical network:

controlling the switching operation of the plurality of transistors of the DC: DC power converter to block the supply of current from the DC power source to the DC electrical network.

* * * * *